United States Patent [19]

Buedel et al.

[11] 3,783,255

[45] Jan. 1, 1974

[54] DATA HANDLING SYSTEM MAINTENANCE ARRANGEMENT FOR PROCESSING SYSTEM TROUBLE CONDITIONS

[75] Inventors: Charles K Buedel, Wood Dale; James P. Caputo, Chicago, both of Ill.

[73] Assignee: GTE Automatic Electric Laboratories Incorporated, Northlake, Ill.

[22] Filed: July 12, 1972

[21] Appl. No.: 270,910

[52] U.S. Cl. .......................................... 235/153 AK

[51] Int. Cl. .......................................... G06f 11/04

[58] Field of Search ................ 235/153 AK, 153 A; 179/175.2 R, 175.2 C, 15 BF; 340/172.5, 146.1 R

[56] References Cited

UNITED STATES PATENTS

| | | | |
|---|---|---|---|
| 3,409,877 | 11/1968 | Alterman et al. | 340/172.5 |
| 3,435,159 | 3/1969 | Brooks et al. | 340/146.1 R |
| 3,492,645 | 1/1970 | Aridas | 235/153 AK |
| 3,517,171 | 6/1970 | Avizienis | 235/153 AK |

*Primary Examiner*—Charles E. Atkinson
*Attorney*—K. Mullerheim et al.

[57] ABSTRACT

A maintenance arrangement for a data handling system producing data handling signals includes logic circuits for responding to a system trouble condition and in turn for generating a servicing request signal to cause servicing equipment to initiate diagnostic operations for the data handling system, and memory control logic circuits that respond to the servicing request signal for causing system trouble identity information indicative of the identity of a certain group of data handling signals associated with the system trouble request signal to be conveyed to the memory of the data handling system for storage therein so that the servicing equipment is assisted in locating the source of the trouble condition. The memory control circuits also supply address information for the system memory for directing the system trouble identity information into a maintenance location therein. After the servicing equipment commences its diagnostic functions, it sets a service bit in the system memory, and in response thereto, the system trouble logic circuits are thereafter inhibited from requesting the servicing equipment for other trouble conditions occurring in connection with the data handling signals until the servicing equipment has completed its function and clears the service bit from the system memory.

15 Claims, 16 Drawing Figures

FIG. 6A
RS MEMORY LAYOUT
| ADDRESS | DATA |
|---|---|
| Z0-Z191 | NORMAL CALL PROCESSING |
| Z 192-Z 201 | SPARE (MAINTENANCE) |
| Z 202 | MISC MAINTENANCE |
| Z 203 | SNAPSHOT |
| Z 204-Z 255 | SPARE |
FIG. 6 C
RS MEMORY LAYOUT Z202
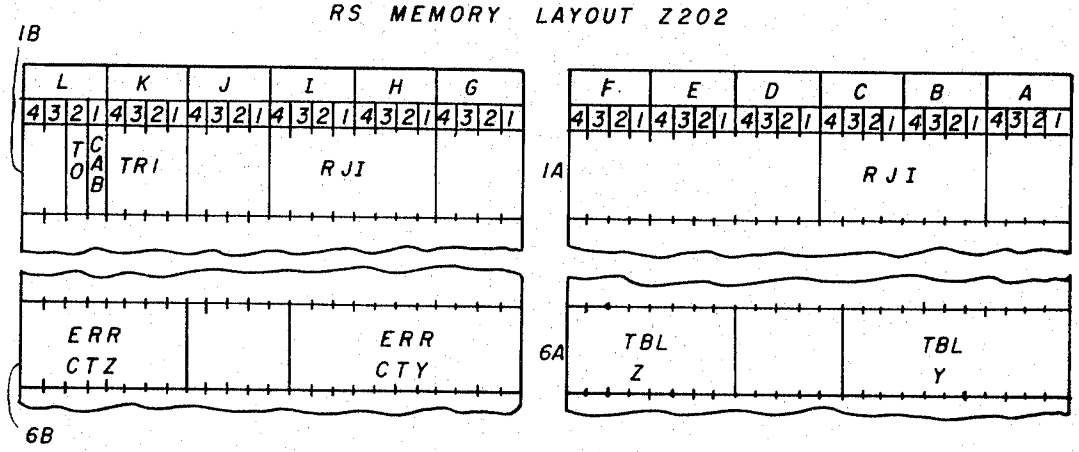
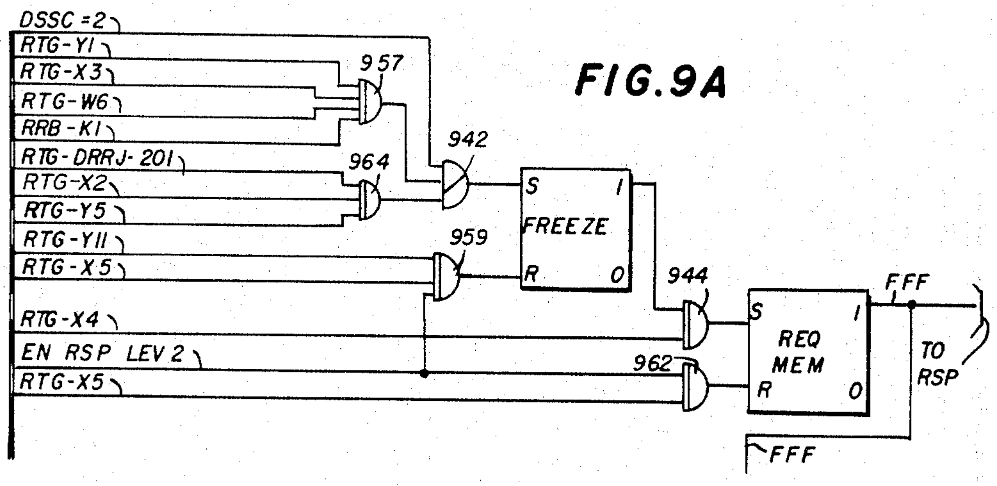
FIG. 9A PATENTED JAN 1 1974 3,783,255
SHEET 07 OF 13
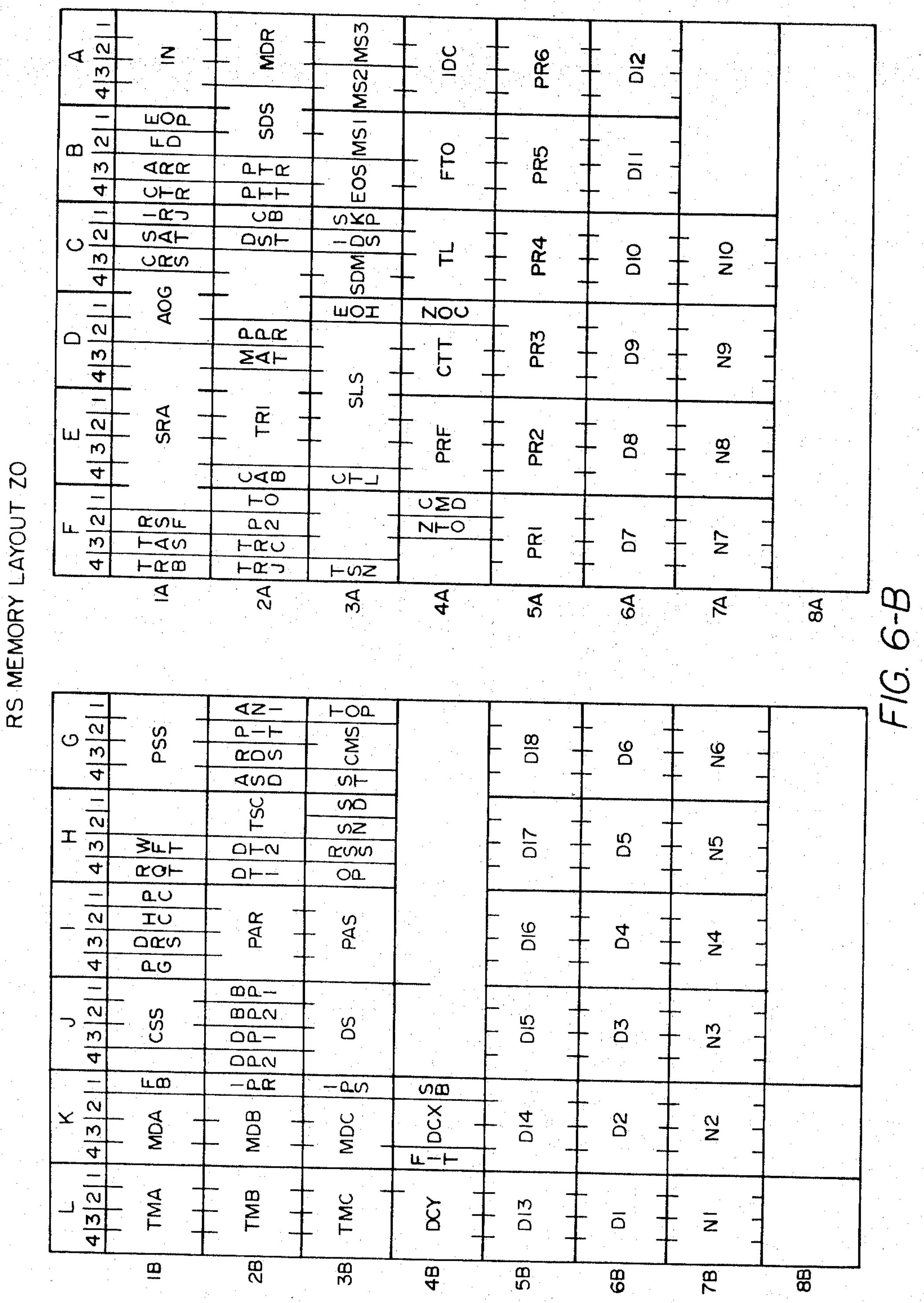
FIG. 6-B

DATA HANDLING SYSTEM MAINTENANCE ARRANGEMENT FOR PROCESSING SYSTEM TROUBLE CONDITIONS

BACKGROUND OF THE INVENTION

1. Field of the Invention

This invention relates to a maintenance arrangement for a data handling system, and it more particularly relates to an arrangement for facilitating the servicing of system trouble conditions occurring in a data handling system.

2. Description of the Prior Art

Data handling systems or data processing systems have been employed for many different purposes, such as for telephone switching systems with time division multiplex arrangements using cyclically recurring time slots for sharing common logic circuits for control functions by a plurality of units, such as registers. Such systems use a memory in which each unit, such as a line, a trunk, a call, or a register has an individual block of storage elements in the memory accessed during its individual time slot of each cycle. The units have associated therewith pools of peripheral equipment such as register junctors and senders for accessing the common logic circuits. For maintenance purposes, the various peripheral equipment and some other apparatus, such as matrices connecting the peripheral equipment to the common logic, are continuously monitored for trouble conditions, such as time-outs, erroneous number of digits being dialed (for example, 11 digits) and other false conditions. Therefore, it would be highly desirable to have a maintenance arrangement which in response to the occurrence of a system trouble condition, requests the services of special equipment for correcting the malfunction, and also for facilitating the diagnostic functions of the servicing equipment so that it can more efficiently and quickly enable the data handling system to be corrected and returned to service.

SUMMARY OF THE INVENTION

The object of this invention is to provide a new and improved maintenance arrangement for a data handling system, which arrangement can respond to a system trouble condition and in turn request the services of other equipment for diagnosing the trouble condition, and which arrangement also facilitates the diagnostic function of the servicing equipment.

According to the invention, there is provided a maintenance arrangement which includes system trobule logic means for generating a servicing request signal for the servicing equipment in response to a system trouble request signal, and memory control logic circuits responsive to the servicing request signal for causing system trouble indentity information indicative of the identity of a certain group of data handling signals associated with the system trouble request signal to be conveyed to the memory of the data handling system for storage in a maintenance location within the memory. The memory control circuits also generate address information for directing the system trouble identity information to the maintenance location within the system memory so that the servicing equipment can readily and efficiently identify a group of signals associated with the system trouble condition. In the disclosed embodiment of the present invention, the system trouble conditions arise from various different equipment sharing the common logic circuits on a time division multiplex basis, and the group of data handling signals are identified by specifying the register in which the system trouble condition occurred. Also, in accordance with the present invention, the servicing equipment can set a service bit in the data handling system memory, and in response to the service bit being set, the system trouble logic circuits are inhibited from acknowledging other system trouble conditions occurring within the same group of data handling signals (registers) until the servicing equipment has completed its diagnostic functions and thereafter cleared the service bit from the system memory.

CROSS REFERENCES TO RELATED APPLICATIONS AND TO INVENTIONS DISCLOSED HEREIN

The memory access, and the priority and interrupt circuits for the register-sender subsystem are covered by U.S. patent application Ser. No. 139,480 filed May 3, 1971, now U.S. Pat. No. 3,729,715 issued Apr. 24, 1973, by C. K. Buedel for a DIGITAL PROCESSING SYSTEM, hereinafter referred to as the REGISTER-SENDER MEMORY CONTROL patent application. Other portions of the register-sender subsystem are disclosed in U.S. Pat. application Ser. No. 201,851 filed Nov. 24, 1971, now Pat. No. 3m737,873 issued June 5, 1973, by S. E. Puccini for a DATA PROCESSOR WITH CYCLIC SEQUENTIAL ACCESS TO MULTIPLEXED LOGIC AND MEMORY, hereinafter referred to as the REGISTER-SENDER patent application.

In addition to the invention claimed herein, there is disclosed several other inventions relating to the maintenance arrangement by inventive entities including one or more of the following and possibly others: C. K. Buedel, J. P. Caputo and G. O'Toole. These inventions include but are not limited to recycling operation per se, error and fault detection, error word, freeze bit, snapshot arrangement, and data collection.

DESCRIPTION OF THE DRAWINGS

FIG. 6 comprising FIGS. 6A, 6B and 6C illustrate the arrangement of information in the memory of the register-sender subsystem.

DESCRIPTION OF THE PREFERRED EMBODIMENT

Figure 1:
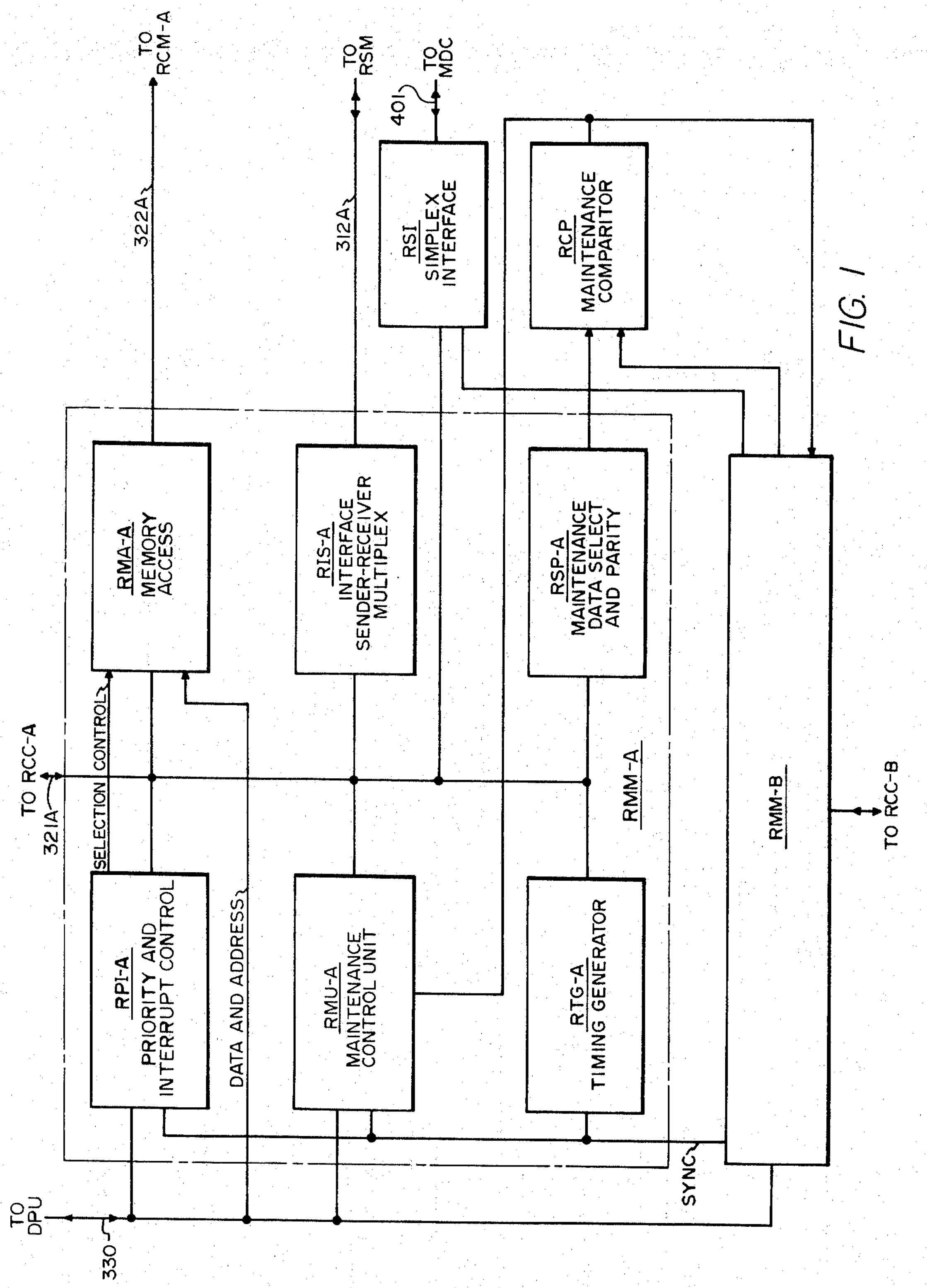
FIG. 1 is a block diagram of the maintenance and memory control of the register-sender subsystem incorporating the principles of the present invention.
Figure 2:
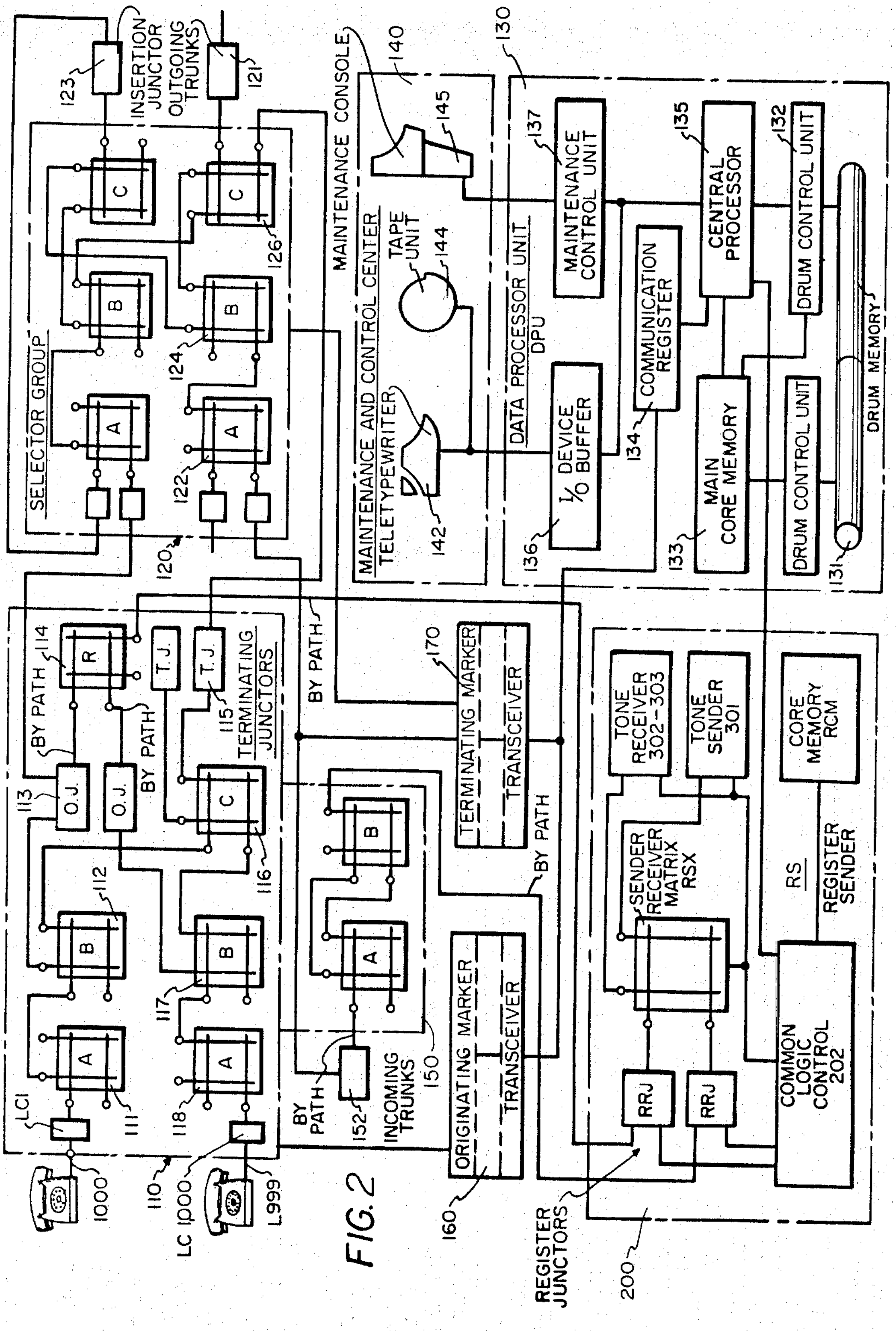
FIG. 2 is a block diagram of a communication switching system incorporating the preferred embodiment of the invention.
Figure 3:
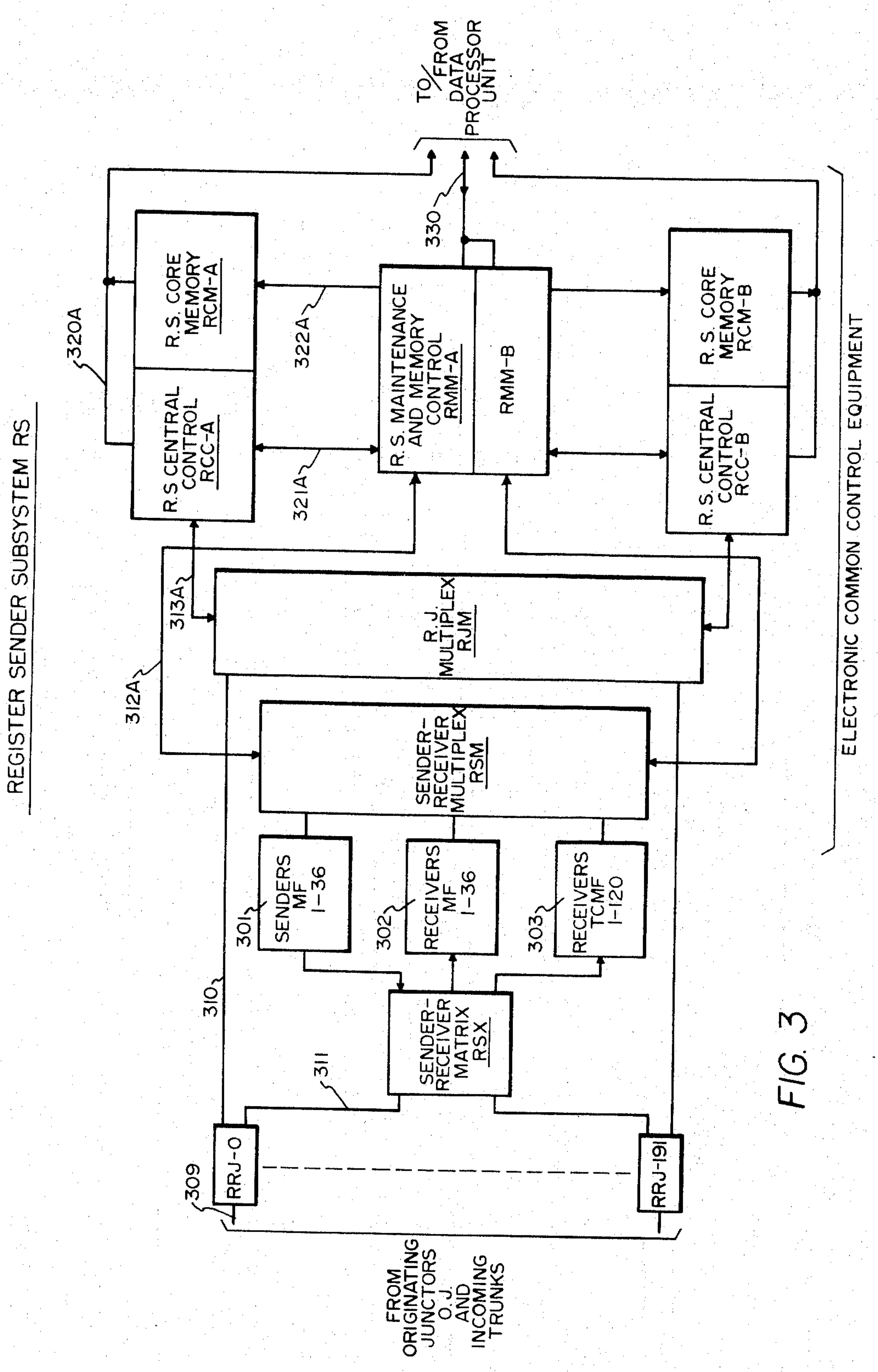
FIG. 3 is a block diagram of the register-sender subsystem.

Referring now to the drawings, and more particularly to FIGS. 1, 2 and 3 thereof, there is shown a system which incorporates the principles of the present invention. The system as shown in FIG. 2 includes a register-sender subsystem RS, and as shown in FIG. 3, the common control portion of the register-sender subsystem RS serves as a data handler and is duplicated with both portions operating in synchronism with one another to perform identical data-handling operations for reliability and flexibility purposes. As shown in FIG. 1, the register-sender subsystem RS includes a maintenance and memory control RMM in duplicated form for providing maintenance control and memory access.

As shown in the block diagram of FIG. 1, the RMM frame comprises some maintenance circuits and some of the common logic circuits for call processing. The maintenance circuits consist of a maintenance control unit RMU, a maintenance data selector and parity generator RSP, and a maintenance comparator RCP. The purpose of the maintenance circuits is to supervise overall operation of the common logic circuits of the register-sender subsystem and to accomplish certain maintenance routines under hardware control and direction of the data processing unit.

The maintenance control unit RMU controls the overall operation of maintenance functions with one of the common logic units and is therefore duplexed, comprising unit RMU–A for operation with the common logic A units, and a corresponding unit as part of RMM–B.

The duplexed maintenance data selector and parity circuits RSP–A and the corresponding unit in block RMM–B has several functions. It selects which data is to be compared during the cycle and gates it to comparison gates, and gates maintenance signals that have to be stored in memory. The unit RSP also generates parity for data and address information going to memory.

The maintenance comparator RCP is a simplex unit which compares the data sent to it from the duplicated RSP units.

The main purpose of the simplex interface circuit RSI is to provide interface between the register sender subsystem and a maintenance unit MCC (FIG. 2). In addition to this interface purpose, the circuit also controls the selection of timing signals depending upon the number of register junctors which are busy, for fast or slow time out.

The register timing generator comprising unit RTG–A and a corresponding unit in block RMM–B supplies timing pulses for the multiplex operation of the register-sender subsystem.

The unit RIS–A and a corresponding unit in block RMM–B operate with the sender-receiver multiplex circuit RSM to provide the multiplex functions between the common logic and the senders and receivers.

The memory access circuit RMA–A and the corresponding duplex unit in block RMM–B provides the access to core memory on a multiplex basis. It provides data multiplex, address multiplex and command multiplex (start read/start write). Output to the register-sender core memory RCM is on a data bus, address bus and command bus shown as cable 322A (FIG. 1). Multiplex commands are controlled by the RPI circuit.

The duplexed priority interrupt circuit RPI–A and the corresponding unit in block RMM–B has the basic control of memory during all operations except maintenance. On a priority basis it determines which source of data and address will be allowed to access memory, generates the read and write commands for call processing, controls writing hardwired data, and controls interrupts sent to the data processing unit. All of these functions are duplexed and checked by the maintenance circuits.

The priority interrupt circuit RPI and the memory access circuit RMA are described in detail in said REGISTER-SENDER MEMORY CONTROL patent application.

GENERAL SYSTEM DESCRIPTION

The telephone switching system is shown in FIG. 2. The system is disclosed in said REGISTER-SENDER patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 170 control the switching networks of the selector group 120 for establishing connections therethough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a sender-receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access bias, and the memory RCM can be accessed by other subsystems such as the data processor unit 130 on a random access basis.

The data processor unit DPU provides stored program computer control for processing calls through the system. Instructions provided by the unit DPU are utilized by the register-senders RS and other subsystems for processing and routing of the call. The unit DPU includes a drum memory 131 for storing, among other information, the equipment number information for translation prupuses. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 110. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

TYPICAL CALLS

This part presents a simplified explanation of how a biasc call is processed by the system. The following call originates from a local party served by one switching unit and is completed to another local party served by the same switching unit.

In the following presentations, reed relays are referred to as correeds. Not all of the data processing operations which take place are included.

LOCAL LINE-TO-LOCAL LINE CALL

When a customer goes off-hook, the D.C. line loop is closed, causing the line correed of his line circuit to be operated. This action constitutes seizure of the central office switching equipment, and initiates a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key) touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communciation register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through, releasing the R matrix. The originating junctor remains held by the terminating junctor via the selector matrix.

REGISTER-SENDER SUBSYSTEM

Referring to FIGS. 2 and 3, the register-sender RS subsystem is a time-shared common control unit with the ability to register and process 192 calls simultaneously from local lines or incoming trunks. The register-sender RS provides the electronic time-shared register apparatus for receiving and storing incoming digits, and pulse generating sender circuitry to forward a call toward its destination. In this regard, the resiter-sender RS generally includes a plurality of register junctors RRJO–RRJ191 which are spaced-divided electromechanical access circuits for providing an interface between the switching matrices of the system and the time-shared register apparatus, which includes the electronic logic of a common logic control 202, and a ferrite-core memory RCM to store digits to be received and sent via the register junctors RRJ and supervisory information pertaining to the calls under the control of the common logic control 202. A sender-receiver matrix RSX selectively connects a plurality of tone receivers and senders 301–303 to the register junctors RRJ for signaling modes other than the dial pulse mode which is provided for by the register junctors RRJ.

The time-shared common logic control 202 of the register-sender is duplicated and runs identical operations in synchronism with one another. Under normal conditions, both sets of time-shared equipment are partially active, one set controlling one-half of the register junctors RRJ and the other set controlling the remaining half of the register junctors RRJ. In case of equipment faults, either set of time-shared equipment can control all of the register junctors RRJ.

The space-divided equipment of the register-sender includes the register junctors RRJ, the senders and receivers, and the sender-receiver matrix RSX. The register junctors RRJ with their associated multiplex equipment RJM provide an interface between the space-divided matrix outlets connected to the register junctors RRJ and the time-shared common logic control 202. The sender-receiver matrix RSX provides a metallic path from the register junctors RRJ to the tone senders and receivers under the control of the common logic control 202. The senders 301 provide for sending in the multifrequency mode, and the receivers provide for receiving in either the touch-calling multifrequency mode from the local lines or the multifrequency mode from the incoming trunks 152.

The register junctors RRJ are the entry and exit point of the register-sender for information transferred between the switching network and the register-sender. The register junctors enable the register-sender to provide the following features: dial pulse receiving and sending, coin and party testing, line busy, dial tone, and reorder tone application. The incoming and outgoing matrix paths are held by the register junctors RRJ during call processing. The register junctors comprise electromechanical components for compatibility with lines, trunks, and switching network circuits, however they also include electronic interfacing circuits which are similar to those in the markers for compatibility with the electronic common logic control 202. Signals from lines, trunks, and network circuits are received by the register junctors and forwarded to the common logic control for processing.

The common logic control 202 contains the control logic for call processing by the register sender 200. The purpose of the common logic control 202 is to perform all functions associated with receiving, sending, and timing of digits, and to control processing of calls by generating commands for other circuits in the register-sender and for the switching network. Since the common logic control 202 operates on a time-shared basis to store call processing information in the memory RCM, the common logic control 202 has the ability to register and process 192 simultaneous calls. The common logic control works closely with the core memory RCM which together form the register apparatus of the present invention, and which provides storage of information concerning the calls in progress and information relating to the data processor unit 130.

The core memory RCM is a conventional ferrite core memory, which need not be disclosed in detail. The memory RCM automaticaly restores the information in the same cores after a read operation, and it likewise automatically clears the information from the cores immediately prior to writing information into them. It is to be understood that the memory RCM could also be any suitable type of non-destructive read-out memory.

The common logic control 202 of FIG. 2 includes duplicated pairs of electronic logic units. As shown in FIG. 3 the common logic comprises a duplicated pair of central control units RCC–A and RCC–B, duplicated core memories RCM–A and RCC–B, and a maintenance and memory control which comprises a duplicated pair of units RMM–A and RMM–B. The units are provided in duplicate for reliability purposes, and each of the duplicated units functions independently as described hereinafter in greater detail. The central control units are connected to the register junctors via an RJ mutliplex unit RJM, and the senders and receivers 301–303 are connected to the maintenance and memory control unit via sender-receiver multiplex unit RSM. The central control unit RCC–A along with core memory RCM–A comprises one frame of equipment, and similarly the units RCC–B and RCM–B are another frame of equipment, while the maintenance control units RMM–A and RMM–B together comprise a frame. The multiplex units each comprise several frames of equipment. The different frames are interconnected via cables which together with driver and receiver circuits as terminations form DC links between the frames.

Figure 5:
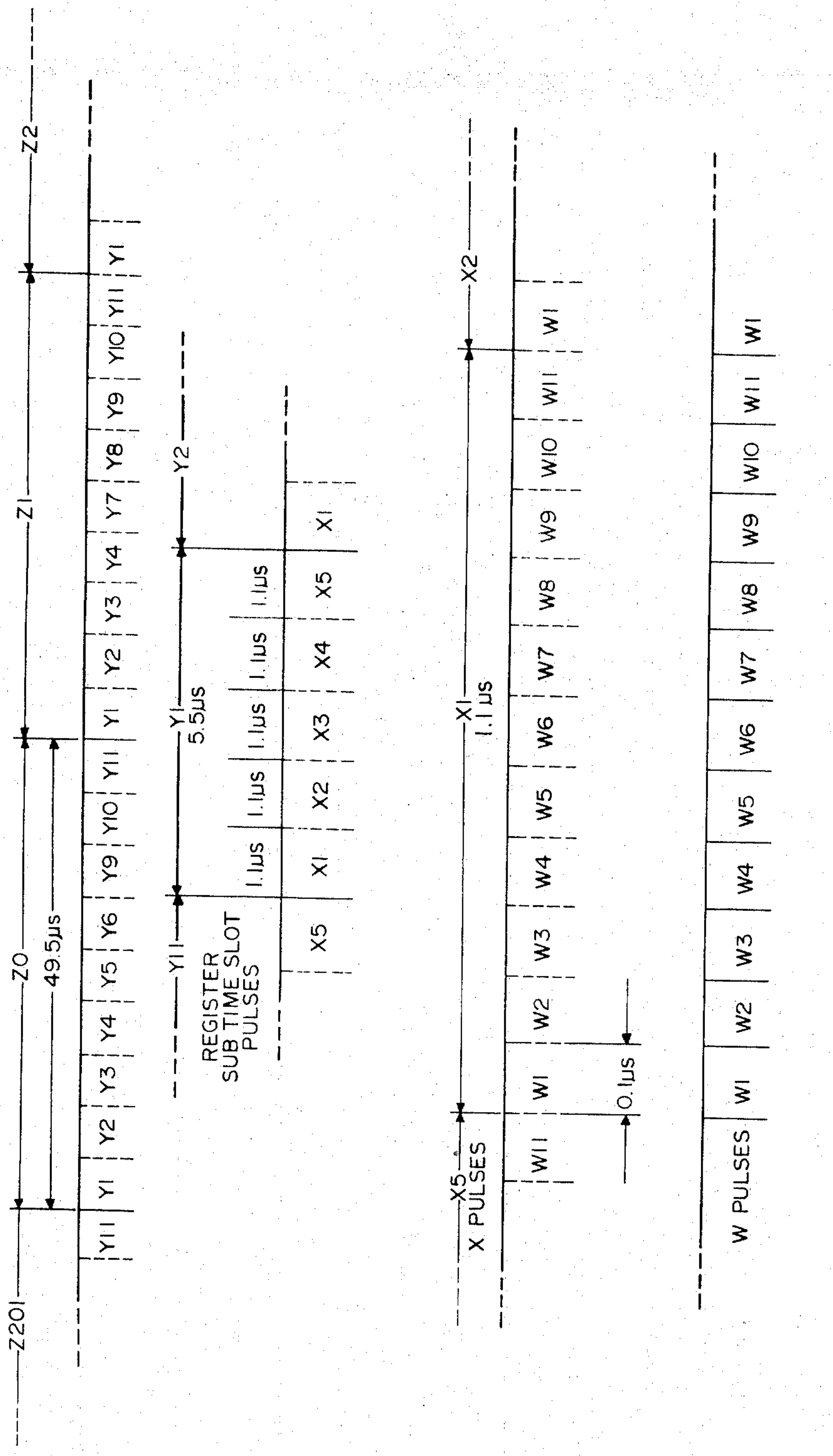
FIG. 5 is a timing diagram showing the timing signals provided by the timing generator of the register-sender subsystem.

The timing relationship of the outputs of the register timing generator (FIG. 1) are shown in graphical form in FIG. 5. The timing signals are produced by X, Y and Z generator pulse distributors (not shown), and the timing can be summarized as follows:

a. A 10-millisecond register-sender cycle time;

b. The overall cycle (10ms) divided into 202 time slot pulses ZO through Z201 (49.5 microseconds each), 192 of which are used for call processing and 10 of which are reserved for maintenance purposes;

c. Each time slot pulse divided into 11 sub-time slot pulses Y1–Y11 (5.5 microseconds each) 9 of which are utilized during each time slot pulse of normal call processing, mode A being shown on the chart for time slot ZO, and mode B being shown for time slot Z1;

d. Each sub-time slot pulse divided into 55 pulses W (0.1 microseconds each) comprising five pulses X1–X5 of 1.1 microseconds each, each divided into 11 W pulses W1–W11 of 0.1 microseconds each. The 55 combinations of X and W timing pulses can be utilized for accessing the memory and different logic circuits during various different times of a single sub-time slot.

The memory address comprises 12 bits of which bits MA4–MA11 designate the Z time slot corresponding to a particular register junctor, bits MA1, MA2 and MA3 designate a particular row of memory of the eight rows assigned to a register junctor and the right or left hand word store of a row is determined by a bit MAO which is obtained from a flip-flop (not shown) in the register priority and interrupt circuit RPI. Note from the sub-time slot decoding arrangement that sub-time slots Y9, Y10 and Y11 have the same memory addresses respectively as sub-time slots Y1, Y2 and Y3; and that the decoded outputs are differentiated by the fact that flip-flop YCM (not shown) of the register timing generator is in the set condition for sub-time slots Y9, Y10 and Y11.

Figure 4:
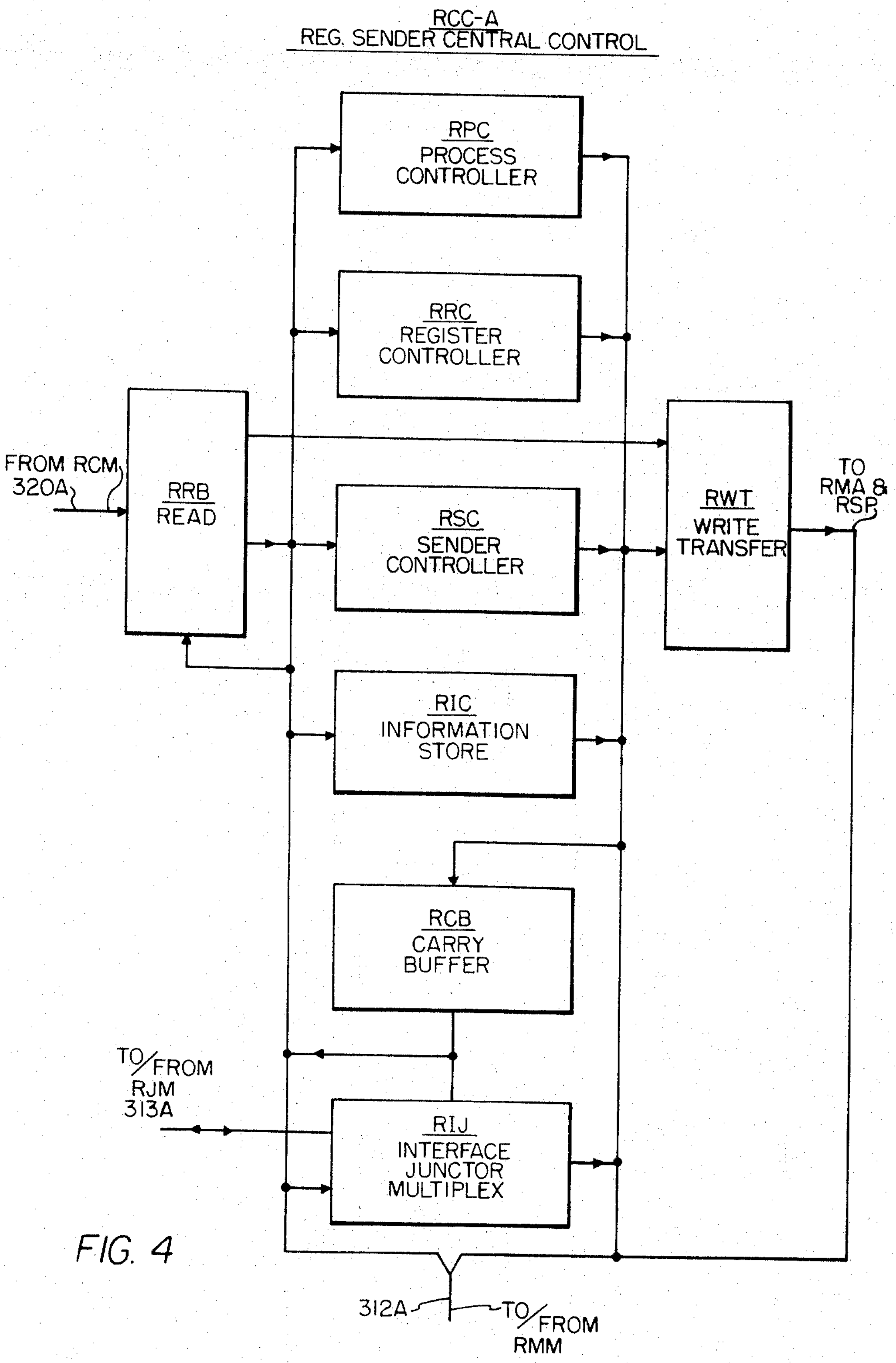
FIG. 4 is a more detailed block diagram of a portion of the register-sender subsystem.

The circuits of the frame RCC–A are shown in the block diagram of FIG. 4. As shown in FIG. 4, the read buffer RRB is a 52-bit register. This circuit is used for temporary storage of two words from a row of the register-sender core memory. The registers are latch circuits that make the data available to the controller circuits, the carry buffer circuits, and the write transfer circuits. The latches correspond to the positions of memory, and 48 of them are designated RRB–A1 through RRB–L4.

The write transfer circuit RWT comprises 48 bit selective input devices. There are eight pairs sets of inputs and a clear memory-circuit used to present data to the memory access circuits RMA. The write transfer circuit RWT can have as its source the different controllers shown in FIG. 4. The outputs from the write transfer circuit RWT are multiplexed with other sources by circuit RMA for writing into the core memories RCM.

The process controller RPC is used to control the process of a call. This unit takes information from the first row (sub-time slot Y1) of a core memory block and information from the register junctors via the multiplex circuit RJM and RIJ. The controller RPC furnsihes much of its data to the carry buffer RCB for controlling other memory word operations. Changes of this processing information are restored to the memory during sub-time slot Y9. The RPC processor also generates the call processing interrupts to the data processing unit.

controller register controllr RRC is used to manipulate register junctor information, primarily for call origination functions. This unit takes its information from row two of the memory, from the carry buffer RCB, and the multiplex circuits RJM and RSM. The processor RRC controls the dial tone application, party testing, digit reception, and start dial signal controls. The results of the data from the RRC processor are used for manipulation in other controllers via the carry buffer RCB, for origination identification from the register junctors via the multiplex circuits RJM, via the multiplex circuits for digit reception, or is written back into memory for storage and later use.

The sender controller RSC is used to manipulate register junctor information primarily for call termination and sending functions. The processor RSC deals with information found in row 3 of the memory. This controller contains information as to start dial signals, method of digit sending, the digit being sent and the pulse count that has been sent of pulse digit; and the sequence of digit sending as to prefix digits, called number and calling number information.

The information storage controller RIC is used for data manipulation in rows 4, 5, 6, 7, and possibly 8 of the memory. The information that is handled consists of digit loading, shifting, retrieval and pattern recognition to and from appropriate places in core memory. Further data is used to set up special actions when particular conditions are recognized.

The carry buffer RCB is a series of latch circuits. There are 60 carry buffer latches. The majority of these latches are used to transfer bits of information from one call processing controller to another controller during different sub-time slots of a time slot period. The normal carry buffer information is not carried over from one RRJ time slot to another with exception of the BY latch, which indicates that a sender or receiver connection is in progress and prevents any other from attempting a connection until completion of the first.

The interface junctor multiplex unit RIJ operates with the junctor multiplex circuits RJM of FIG. 3 for multiplex to and from the register junctors.

REGISTER-SENDER MEMORY LAYOUT

Referring now to FIG. 6 comprising FIGS. 6A, 6B and 6C, there is shown the arrangement of information for the memory RCM of the register-sender subsystem RS. As shown in FIG. 6A, there are 256 blocks of information, each block being assigned an individual Z designation number. However, only blocks Z0 through Z201 are assigned a Z time slot pulse, and thus only blocks ZO through Z201 are accessed in a cyclical time division multiplex manner, and the remaining memory blocks Z202 through Z255 are randomly accessible by the unit DPU and the register sender RS. The blocks designated Z0 through Z191 store normal call processing information, and the blocks Z192 through Z201 are spare blocks which may be used for maintenance purposes, and which may be used by the unit DPU to store information therein to simulate a call processing memory block for maintenance purposes. Certain maintenance words are stored in the block Z202, and the block Z203 stores snapshot data utilized for maintenance. The remaining memory blocks Z204 through Z255 are additional blocks for expansion purposes and may be used for different purposes, such as call processing and maintenance.

The layout of FIG. 6B designates the storage of information in the sixteen word stores of a typical call processing block, such as block Z0, assigned to one register junctor. Section D of the REGISTER-SENDER patent application described the individual fields, using mnemonic headings shown in FIG. 6B, and are expalined therein in the following manner under each mnemonic:

1. Name corresponding to the mnemonic symbol
2. Location in the memory by word designation and bit position
3. Functional description
4. Control
5. Timing
6. Cross-reference and inter-related fields
7. Comments The data processing unit has control by direct access to the register-sender core memory RCM and writes information into a particular word store of a particular register junctor, while control from the register-sender RS means that processing in the register-sender common logic circuit provides information stored into the memory during the regular core memory multiplex cycle. The information from the data processing unit is supplied on a random access basis to the memory, with an interlock arrangement to prevent the information being supplied during the time slot for the corresponding register junctor. The data processing unit also reads information by direct random access to the register-sender core memory in response either to interrupt signals from the register-sender subsystem or to conditions internally recognized by the data processor.

As shown in FIG. 6C, certain control information and data information for maintenance purposes are stored in block Z202. It should be noted that only portions of four words of two available rows are utilized, and the remaining storage areas of block Z202 are unused.

The information RJI is the identity of the currently scanned register junctor and is stored in word 1A of row 1 of block Z202. This information enables the data processor unit DPU to know the address of the call processing register currently being scanned so that the data processor unit DPU can determine whether or not the unit DPU can access a given number of words from a register before it is accessed by the central control RCC. The relative scan position is transferred from the memory RCM to the data processor unit DPU. The currently-scanned register junctor identity is written into the word 1A of block Z202 in each time slot for each register junctor. The data processor unit 130 can therefore read this RJI word whenever it desires to know the address of the currently scanned register.

As hereinafter described in greater detail, the system trouble interrupt word is stored in word store 6A by the maintenance unit RMM to identify the particular call processing memory block requesting a system trouble interrupt. Similarly, the error count word is stored in word store 6B by the maintenance unit RMM to identify the call processing memory block which is requesting an error count interrupt.

Call processing information is stored in word store 1B and comprises a time-out bit TO, a call-abandoned bit CAB, the translation instruction TRI, and the information TRI which indicates the cause for a translation by the data processor, and the information RJI which is the identity of the register junctor requiring the translation.

MAINTENANCE CONTROL UNIT, MAINTENANCE DATA SELECT AND PARITY, AND MAINTENANCE COMPARATOR

Considering now the maintenance arrangement of the present invention with particular reference to FIGS. 7 through 12 of the drawings, there is shown the maintenance arrangement of the present invention shown in symbolic block diagram form. The logic circuits of the maintenance arrangement are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited respectively by commercial availibility and by loading requirements well known in the art. Latches are indicated in the drawings by square or rectangular functional blocks with inputs designated S and R for set and reset respectively; the circuit being in practice implemented generally by two NAND gates with the output of each connected to an input of the other, which makes the circuit a bistable device. The logic also uses bistable devices in the form of JK flip-flops implemented with integrated circuits to form counters, which are indicated in the drawings by rectangles being subdivided into a number of subboxes, each representing a separate JK flip-flop stage. Not all of the internal wiring of the counters is shown for sake of clarity in the drawings, but it is to be understood that those skilled in the art can provide the necessary internal wiring to accomplish the described functions of the counters.

As shown in FIG. 1 of the drawings, the register-sender memory and maintenance control RMM includes in duplicated form for maintenance purposes a maintenance control unit RMU and a maintenance data select and parity unit RSP. The letter "A" designation shown in the drawings designates the portions of the unit RMM–A, and the letter "B" designations refer to portions of the duplicated unit RMM–B. It should be noted that the timing generator RTG is also duplicated, and that a single maintenance comparator RCP is provided in simplex form for comparing the signals supplied to it by the maintenance data select and parity units RSP–A and RSP–B.

Figure 8:
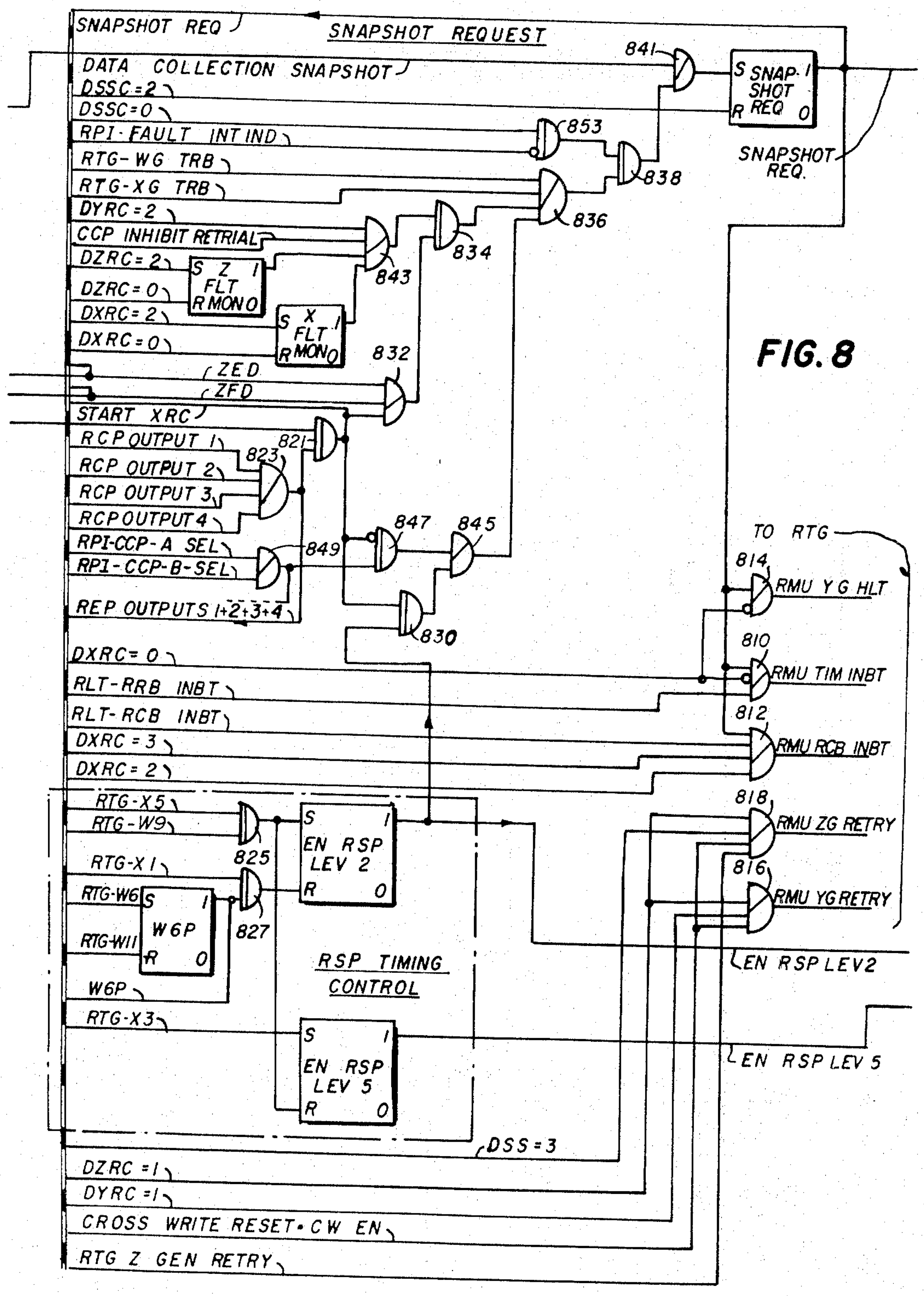

In considering the maintenance arrangement, the "A" units will now be described in detail, it being understood that the "B" units of the maintenance arrangement are identical to the "A" units. The maintenance arrangement rechecks the signals produced by the register-sender subsystem RS by adjusting the register-sender timing generator RTG to repeat at least selected ones of the timing signals, and in response to a false signal condition occurring in the subsystem RS, the maintenance arrangement adusts the timing generator RTG to reproduce the signals required to allow the false signal condition to exhibit itself again. As shown in FIG. 8, in response to a false signal condition, which is recognized by the comparator RCP as a non-comparison condition, an OR gate 810 generates a signal RMU TIM INBT to inhibit all of the set and reset pulses associated with the RRB, RSM and RJM units so that during the rechecking or recycling operation, selected signals to the RCC logic circuits are prevented from changing. Similarly, an OR gate 812 responsive to a false signal condition generates a signal RMU RCB INBT to prevent any change in the signals produced by the unit RCB by inhibiting its set and reset pulses supplied thereto. In this regard, the signals RMU TIM INBT and RMU RCB INBT are transferred to the timing generator RTG to inhibit the set and rest pulses supplied therefrom to the above-mentioned units of the register-sender subsystem RS. Additionally, in response to a false signal condition occurring among a selected group of signals from the register-sender subsystem RS, and generator recycle is initiated in response to a signal RMU Y G HLT generated by an OR gate 814 whereby the Y generator pulse distributor (not shown) halts or ceases operation at its current state to enable the X generator pulse distributor (not shown) to repeat one complete cycle of its operation. In response to a false signal condition occurring during another selected group of signals, an OR gate 816 generates a signal RMU YG RETRY to cause the Y generator pulse distributor to be reset to Y1 and to cause the Z generator pulse distributor (not shown) to be inhibited, whereby the Y generator pulse distributor repeats the Y timing pulses from Y1, the Z generator pulse distributor being prevented from advancing during the Y recycle operation. An OR gate 818 generates a signal RMU ZG RETRY to reset the Y generator and the Z generator pulse distributors to the respective signals Y1 and Z0 to recycle the timing pulses starting from Y1 Z0 through the Z state at which the recycle began. As a result, the Z recycle causes certain timing signals from the register timing generator RTG TO be repeated so that the signals from the register-sender subsystem RS causing a false signal condition are reproduced. Each one of the above-mentioned signals is transmitted to the register timing generator RTG, and for a more detailed explanation of the manner in which these signals affect the timing generator, reference may be made to the REGISTER-SENDER patent application. It should also be noted that while the illustrated and described logic circuits and signals of the maintenance apparatus are each individual to the "A" unit of the maintenance apparatus, the "A" designation for the logic circuits and signals have been omitted from the drawings and description for sake of simplicity, unless clarity requires the fse of such a designation as in the case where signals are being transferred to and from the duplicated pairs of units.

Figure 9:
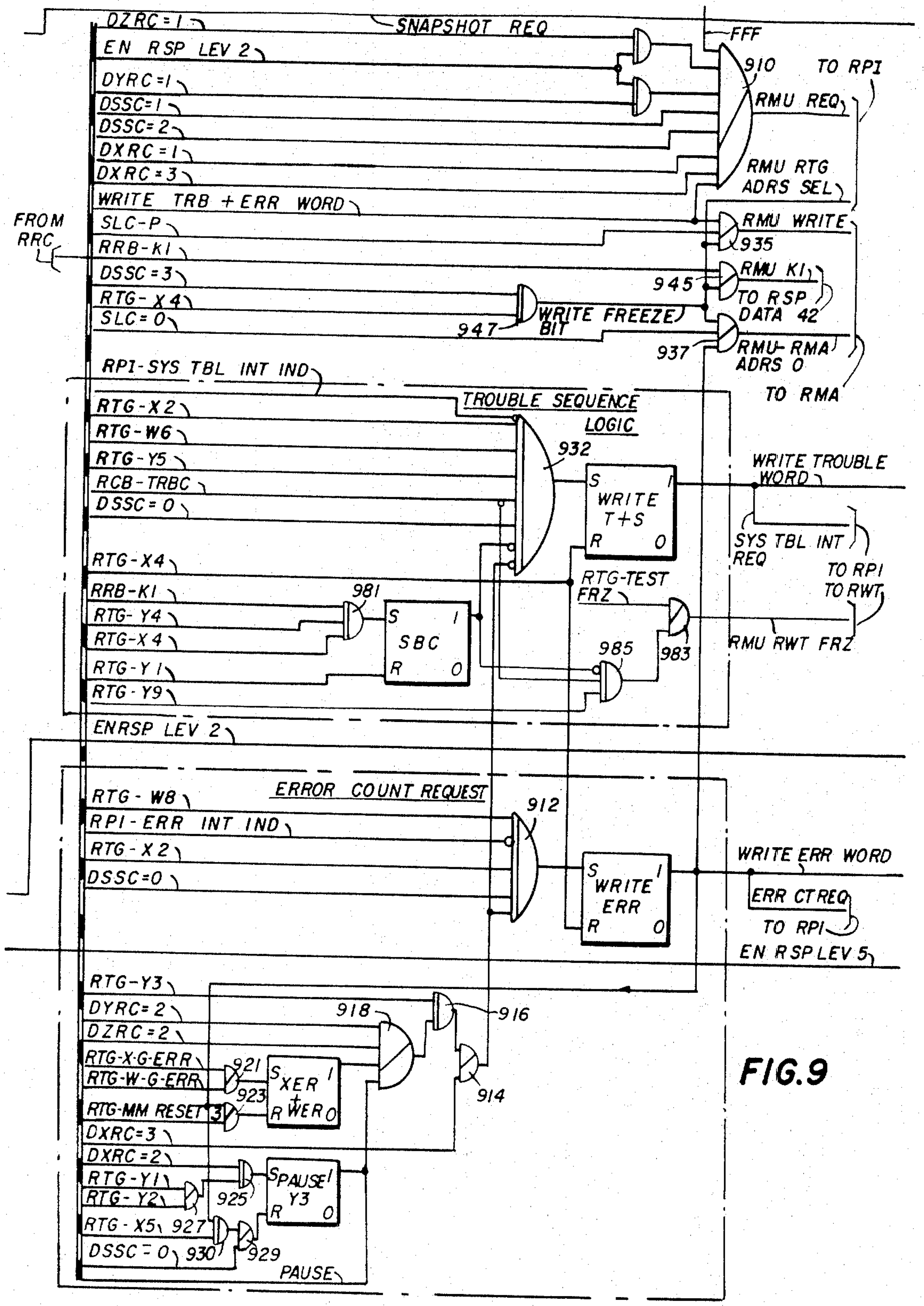
Figures 10, 13:
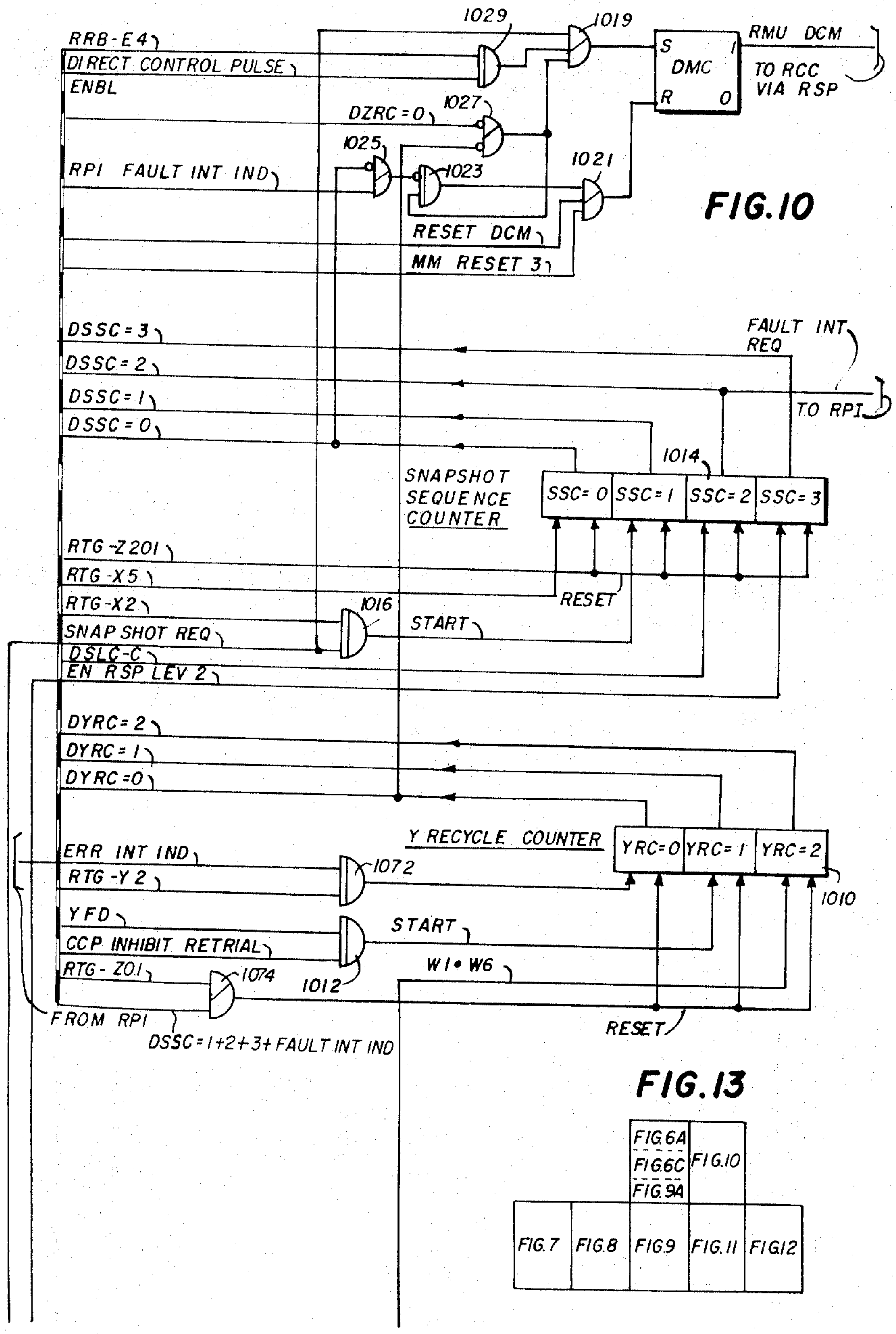
Figure 11:
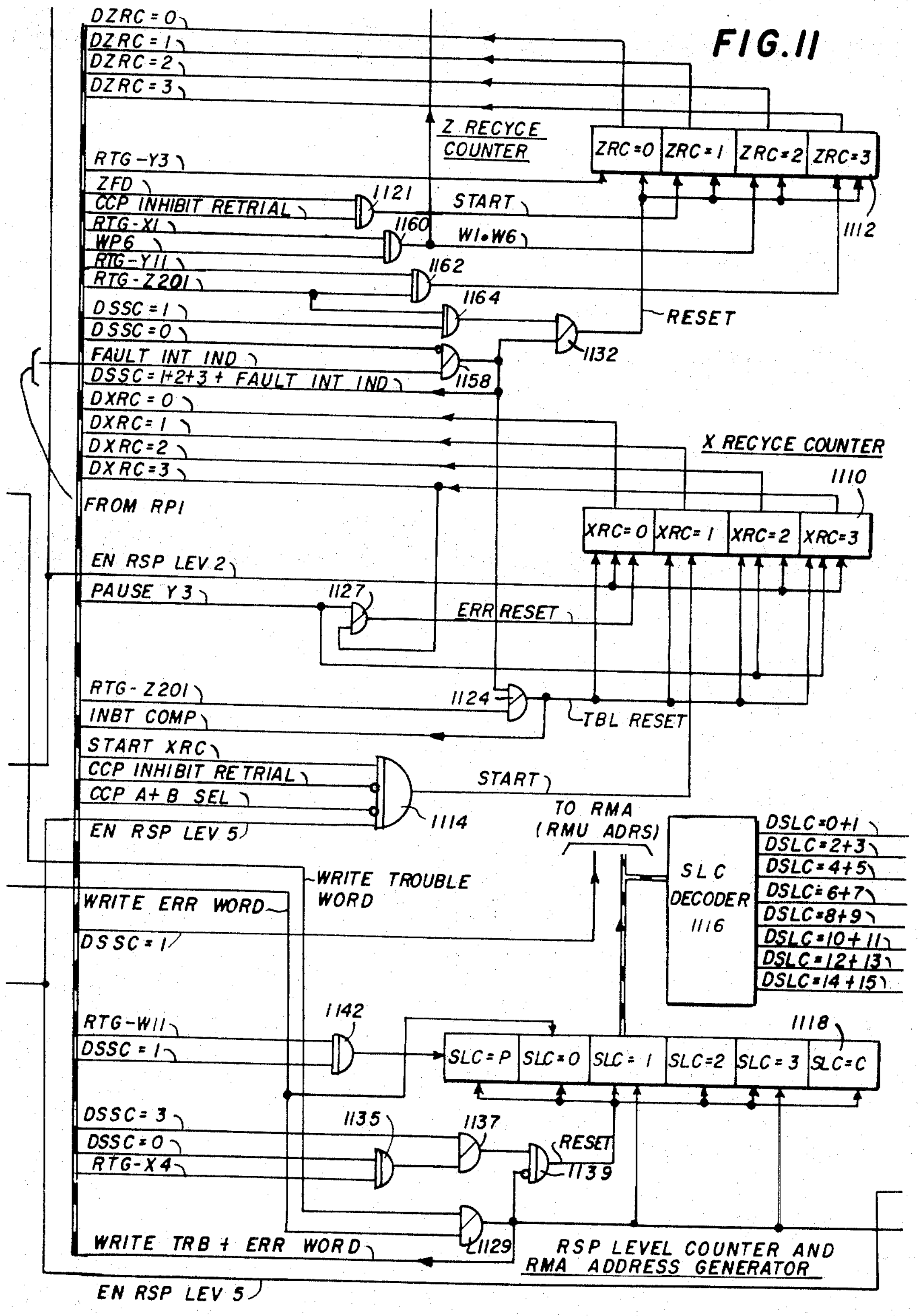

In order to energize the gates 810, 812 and 814, an X recycle counter 1110 as shown in FIG. 11 generates signals to control the X recycle operation. The X recycle counter is a four-stage ring counter and is used during a non-comparison detection of the signals from the register-sender subsystem RS to enable the X generator pulse distributor of the timing generator RTG to repeat a cycle of X timing signals. During the X recycle, the X recycle counter provides the inhibiting functions for the common logic unit for normal call processing. As shown in FIG. 10, a Y recycle counter 1010 comprising a three-stage ring counter enables the gate 816 of FIG. 8, and similarly, a Z recycle counter 1112 of FIG. 11 comprising a four-stage ring counter, energizes the gate 818 during a Z recycle operation. As shown in FIG. 9, an OR gate 910 generates a signal RMU REQ, which is a request signal transmitted to the unit RPI in response to the X, Y and Z recycle counters to prevent signals in the register-sender memory RCM from being changed by inhibiting logic circuits (not shown) in the unit RPI during recycling operations. For a detailed explanation of the circuits in the unit RPI, reference may be made to the REGISTER-SENDER MEMORY CONTROL patent application. Also, as shown in FIG. 10, during either a Y generator recycle or a Z generator recycle, a latch DMC is set to generate a signal RMU DMC which is conveyed to the central control unit RCC via the unit RSP of the maintenance arrangement to prevent a sender-receiver matrix from connecting another call and thus to prevent the central control unit RCC from causing a trouble condition from occurring. It should be noted that during a Y generator recycle operation, the Y generator is reset to Y1 and then cycled to the last appropriate Y sub-time slot which may be either Y9 or Y11 depending upon the particular mode of operation as expalined in detail in the REGISTER-SENDER MEMORY CONTROL patent application.

It should be understood that the foregoing-mentioned inhibit signals generated during the various different recycling operations cause the inputs to the logic circuits (not shown) generating the signals to be repeated so that any changes in external conditions will not change the signals causing the false signal condition (non-comparison) whereby the same signals will be repeated when the appropriate register timing generator counters are recycled and thus the equipment in the system is thereby rechecked. Moreover, some of the signals being monitored for possible non-comparisons include the signals produced by the Y and Z generator pulse distributors, whereby a non-comparison between any pair of Y or Z signals indicate that Y or Z generator pulse distributors of the register timing generators are out of synchronism. The X and W counters of the register timing generators are provided with their own internal resynchronizing equipment, which is disclosed in co-pending U.S. patent application, entitled "SYNCHRONIZING ARRANGEMENT FOR HIGH SPEED TIMING GENERATORS" by G. O'Toole, Ser. No. 261,872, filed June 12, 1972.

Figure 12:
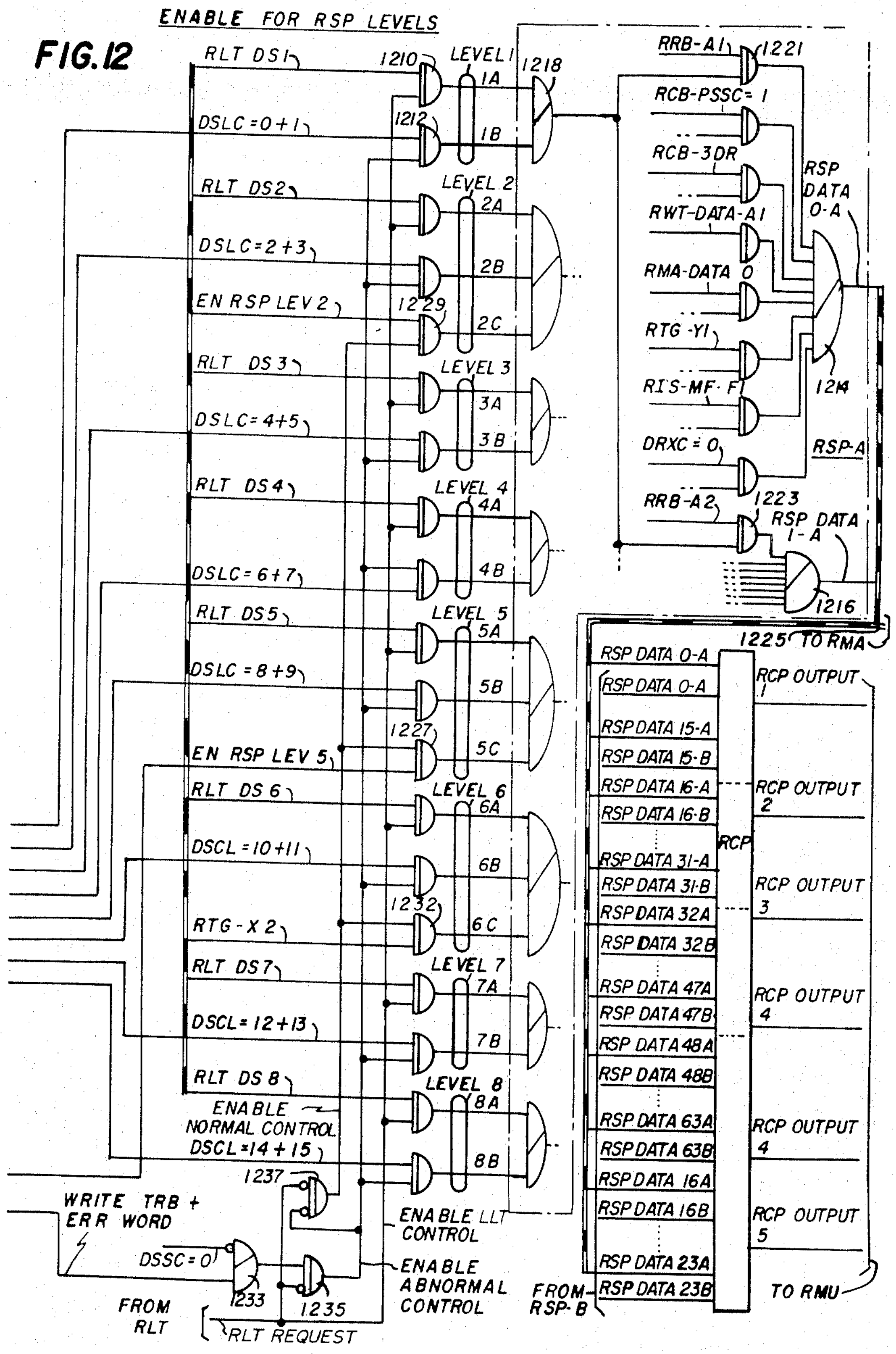

An X recycle operation is initiated in response to a signal START being generated by an AND gate 1114 of FIG. 11 to cause the X recycle counter 1110 to advance from XRC = 0 to XRC = 1, whereby an X recycle operation commences. An AND gate 821 as shown in FIG. 8 generates a signal START XRC for enabling the gate 1114. The gate 821 is enabled in response to the comparison timing logic circuits shown in FIG. 7 and in response to the output of an OR gate 823, which is energized in response to any one of four comparison output signals from the comparator RCP shown in FIG. 12. The comparator RCP matches signals conveyed to it from the unit RSP–A with the corresponding signals from the unit RSP–B. The comparator RCP compares five groups of pairs of the signals, and if a mismatch or disagreement occurs between the signals of any one or more of the pairs of signals, the comparator RCP generates mismatch output signals, such signals being designated RCP OUTPUT 1 through 5. The compartor RCP comprises conventional exclusive -OR circuitry. The unit RSP– A as shown in FIG. 12 contains multiplexing logic circuit for gating certain signals, such as the signal RMA–DATA$\phi$, from various portions of the register-sender subsystem RS to continuously monitor them for non-comparison purposes, whereby a non-comparison or mismatch indicates a false signal condition to trigger a recycle operation. As shown in FIG. 12, a series of AND gates, such as the gate 1210, are provided for enabling the various multiplexing logic circuitry of the unit RSP. The RSP enabling logic circuits include eight sets of AND gates for providing eight different sets of level signals to select certain ones of the signals being monitored by the unit RSP. For example, level 1 includes a pair of AND gates 1210 and 1212 which when activated generate the respective signals 1A and 1B for enabling the level 1. The gate 1210 is energized by a signal RLT DS1 from a manual test panel RLT which is used for test purposes, and the gate 1212 is enabled by a signal DSLC = 0 + 1 from a decoder 1116, which in turn is a binary-to-decimal decoder of the states SLC = 1, SLC = 2, and SLC = 3 of the RSP sequence level counter and RMA address generator 1118 of FIG. 11 to provide the necessary timing control for gating the signals from the unit RSP to the comparator RCP.

The unit RSP has a series of output signals, such as signal RSP DATA 0–A and signal RSP DATA 1–A, which are conveyed to the comparator RCP. Each one of the output signals from the unit RSP is generated by a series of individually associated OR gates, such as the OR gates 1214 and 1216 associated respectively with the signals RSP DATA 0–A and RSP DATA 1–A. A series of a group of eight AND gates are individually associated with and energize selectively the OR gates, each one of the AND gates of the group of eight AND gates being energized by one of a series of eight OR gates, such as the OR gate 1218, associated with the eight level signals. For example, the OR gate 1218 has its inputs energized by the signals 1A and 1B of level 1 and has its output connected to the inputs of the first AND gate of each one of the groups of AND gates, such as the AND gate 1221 having its other input energized by the signal RRB–A1 and having its output connected to one of the inputs of the OR gate 1214, the output of the OR gate 1218 being also connected to one of the inputs of an AND gate 1223 which has its other input energized by the signal RRB–A2 and has its output connected to one of the eight inputs to the OR gate 1216.

The following is a table A listing the various signals being monitored by the unit RSP and is presented to show substantially all of the monitored signals from an actual register-sender subsystem:

TABLE A

| Bits (see notes) | Level 1 | Normal level 2 X5 W9 to X1 W6 | Level 3 | Level 4 | Normal level 5 X3 to X5 W9 | Normal level 6 X2 | Level 7 | Level 8 |
|---|---|---|---|---|---|---|---|---|
| | RRB A1-L4, etc. | RCB, etc. | RCB, etc. | RXT Data A1-L4 | Data Ø-23, etc. | Timing, etc. | RIS Data, etc. | RMU Data, etc. |
| Ø | RRB A1 | RCB PSSC-1 | RCB 3DR | RWT DATA A1 | DATA Ø | Y1-B | -RIS-MF-F1 | DXRC=Ø |
| 1 | RRB A2 | RCB PSSC-2 | RCB DRSC | RWT DATA A2 | DATA 1 | Y2-B | -RIS-MF-F2 | DXRC=1 |
| 2 | RRB A3 | RCB PSSC-4 | RCB NPSS-1 | RWT DATA A3 | DATA 2 | Y3-B | -RIS-TC-F3 | DXRC=2 |
| 3 | RRB A4 | RCB PSSC-8 | RCB NPSS-2 | RWT DATA A4 | DATA 3 | Y4-B | -RIS-TC-F4 | DXRC=3 |
| 4 | RRB B1 | RCB PARC-1 | RCB NPSS-4 | RWT DATA B1 | DATA 4 | Y5-B | -RIS-MF-F5 | DYRC=Ø |
| 5 | RRB B2 | RCB PARC-2 | RCB NPSS-8 | RWT DATA B2 | DATA 5 | Y6-B | -RIS-TC-F6 | DYRC=1 |
| 6 | RRB B3 | RCB PARC-4 | RCB PRFC-1 | RWT DATA B3 | DATA 6 | Y7-B | -RIS-TC-F7 | DYRC=2 |
| 7 | RRB B4 | RCB PARC-8 | RCB PRFC-2 | RWT DATA B4 | DATA 7 | Y8-B | -RIS-TC-F8 | DZRC=Ø |
| 8 | RRB C1 | RCB YCM-1 | RCB PRFC-4 | RWT DATA C1 | DATA 8 | Y9-B | RSM PC | DZRC=1 |
| 9 | RRB C2 | RCB INC-1 | RCB PRFC-8 | RWT DATA C2 | DATA 9 | Y1Ø-B | RSM HC | DZRC=2 |
| 10 | RRB C3 | RCB INC-2 | RCB RCR | RWT DATA C3 | DATA 1Ø | Y11-B | -RSM DR1 | DZRC=3 |
| 11 | RRB C4 | RCB INC-4 | RCB SPAR | RWT DATA C4 | DATA 11 | | -RSM DR2 | -RMU-DMC |
| 12 | RRB D1 | RCB INC-8 | | RWT DATA D1 | DATA 12 | | -RSM DR4 | -RMU-TIM-INBT |
| 13 | RRB D2 | RCB SLSC-1 | | RWT DATA D2 | DATA 13 | | -RSM DR8 | RMU-Y-G-HLT |
| 14 | RRB D3 | RCB SLSC-2 | | RWT DATA D3 | DATA 14 | | -RSM RD | -RMU-RCB-INBT |
| 15 | RRB D4 | RCB SLSC-4 | | RWT DATA D4 | DATA 15 | | -RJM PH | RMU-Y-G-RETRY |
| 16 | RRB E1 | RCB SLSC-8 | | RWT DATA E1 | DATA 16 | MA4-A | -RJM-TSD | RMU-Z-G-RETRY |
| 17 | RRB E2 | RCB FITC | | RWT DATA E2 | DATA 17 | MA5-A | | RMU-YCM2 |
| 18 | RRB E3 | RCB RQTC | | RWT DATA E3 | DATA 18 | MA6-A | | -FFF |
| 19 | RRB E4 | RCB EOPC | | RWT DATA E4 | DATA 19 | MA7-A | | -SLC-P |
| 20 | RRB F1 | RCB DSC-1 | | RWT DATA F1 | DATA 2Ø | MA8-A | | RMU ADRS Ø |
| 21 | RRB F2 | RCB DSC-2 | | RWT DATA F2 | DATA 21 | MA9-A | | RMU ADRS 1 |
| 22 | RRB F3 | RCB DSC-4 | | RWT DATA F3 | DATA 22 | MA1Ø-A | | RMU ADRS 2 |
| 23 | RRB F4 | RCB DSC-8 | | RWT DATA F4 | DATA 23 | MA11-A | | RMU ADRS 3 |
| 26 | RRB G1 | RCB RSFC | | RWT DATA G1 | DATA ADRS Ø | RTM-FT-INC | RSM ODP FD IN | RMU ADRS 4 |
| 27 | RRB G2 | RCB TRIC-1 | | RWT DATA G2 | DATA ADRS 1 | RTM-FT-LOC | RSM ODP FD OUT | -SLC-C |
| 28 | RRB G3 | RCB TRIC-2 | | RWT DATA G3 | DATA ADRS 2 | RTG-X-G-TBL | RSM FAP FD IN | |
| 29 | RRB G4 | RCB TRIC-4 | | RWT DATA G4 | DATA ADRS 3 | RTG-W-G-TBL | RSM FAP ED OUT | -MCC DIS |

It should be noted from the foregoing table A that levels 2, 5 and 6 are designated as normal comparison levels, which means that only those three levels are continuously monitored one at a time for possible mismatches to trigger recycle operations. However, all eight levels are activated one at a time in response to a fault condition occurring. A fault condition occurs when a non-comparison is repeated during recycle operation. The energization of all eight levels is referred to as a "snapshot," and when a snapshot is taken, all of the signals shown in the table A are conveyed via the unit RSP through a wire group 1225 (FIG. 12) to the memory access RMA and thence to the memory and stored in the special auxiliary memory storage area Z203. The snapshot operation is described hereinafter in greater detail.

Referring again to the Y recycle counter 1010 of FIG. 10, an AND gate 1012 generates a start signal for TABLE A—Continued

| Bits (see notes) | Level 1 | Normal level 2 X5 W9 to X1 W6 | Level 3 | Level 4 | Normal level 5 X3 to X5 W9 | Normal level 6 X2 | Level 7 | Level 8 |
|---|---|---|---|---|---|---|---|---|
| | RRB A1-L4, etc. | RCB, etc. | RCB, etc. | RXT Data A1-L4 | Data Ø-23, etc. | Timing, etc. | RIS Data, etc. | RMU Data, etc. |
| 30 | RRB H1 | RCB TRIC-8 | | RWT DATA H1 | DATA ADRS 4 | -RTG-ITT | RSM UAP FD IN | -MCC IPLS |
| 31 | RRB H2 | RCB CL | | RWT DATA H2 | DATA ADRS 5 | -RTG-LTT | RSM UAP FD OUT | -MCC RMR |
| 32 | RRB H3 | RCB HRJ | | RWT DATA H3 | ADRS 6 | -TRANSLATION REQ. SERVED. | ZC PAR FD IN | -MCC RMS NL |
| 33 | RRB H4 | RCB OPC | | RWT DATA H4 | ADRS 7 | | -ZC PAR FD OUT | -MCC RTC NL |
| 34 | RRB I1 | RCB SNC | | RWT DATA I1 | ADRS 8 | | RJM PAR FD IN | -RTM-FT |
| 35 | RRB I2 | RCB CST | | RWT DATA I2 | ADRS 9 | | RJM PAR FD OUT | SNAPSHOT REQ. |
| 36 | RRB I3 | RCB TR | | RWT DATA I3 | ADRS 10 | -RMU ADRS. SEL. BUFF | ZA PAR FD IN | -DIRECT CONTROL LATCH EN |
| 37 | RRB I4 | RCB PB | | RWT DATA I4 | ADRS 11 | -RTG ADRS SEL. BUFF | -ZA PAR FD OUT | -DIRECT CONTROL PULSE EN |
| 38 | RRB J1 | RCB PTC | | RWT DATA J1 | RSP GEN. DATA 24 BUFF | -CURRENT RRJ ADRS SEL. BUFF | RJM S/R FD | ROUTINE RCP OUTPUT 1 |
| 39 | RRB J2 | RCB BD1 | | RWT DATA J2 | | -REQ. FOR TR ADRS SEL. BUFF | RSM S/R FD | ROUTINE RCP OUTPUT 2-4 |
| 40 | RRB J3 | RCB RD2 | | RWT DATA J3 | ADRS 12 BUFF | RIJ-RJM ODD PARITY | -RJM CONF CLU-A TO GRP Ø | ROUTINE RCP OUTPUT 5 |
| 41 | RRB J4 | RCB JC1 | | RWT DATA J4 | | RIS-RSM ODD PARITY | RJM CONF CLU-A TO GRP 2 | RMU RWT FRZ BIT |
| 42 | RMU K1 | RCB JC2 | | RWT DATA K1 | -RWT SEL A-F BUFF | RRB PARITY BIT 1 | -RJM CONF CLU-A TO GRP 4 | |
| 43 | RRB K2 | RCB JC3 | | RWT DATA K2 | -RWT SEL G-L BUFF | RRB PARITY BIT 2 | -RJM CONF CLU-A TO GRP 6 | |
| 44 | RRB K3 | RCB TXD | | RWT DATA K3 | -START READ BUFF | | RSM CONF CLU-A TO FL 1 | |
| 45 | RRB K4 | RCB BY | | RWT DATA K4 | -START WRITE BUFF | | RSM CONF CLU-A TO FL3 | |
| 46 | RRB L1 | RCB TRBC | | RWT DATA L1 | -RMU DATA 0-23 SEL. BUFF | | -RSM CONF CLU-A TO FL 5 | |
| 47 | RRB L2 | RCB FDC | | RWT DATA L2 | -RMU DATA 26-49 SEL. BUFF | | -RSM CONF CLU-A TO FL7 | |
| 48 | RRB L8 | RCB TRR | | RWT DATA L3 | -RRB SEL. BUFF | | | |
| 49 | RRB L4 | RCB SR5 | | RWT DATA L4 | -RTG DATA SEL. BUFF | | | |
| 52 | RRB A1 | RCB 3DR | | | | | | |
| 53 | RRB A2 | RCB DRSC | | | | | | |
| 54 | RRB A3 | RCB NPSS-1 | | | -RMU ADRS SEL. BUFF | | | |
| 55 | RRB A4 | RCB NPSS-2 | | | -RTG ADRS SEL. BUFF | | | |
| 56 | RRB B1 | RCB NPSS-4 | | | -CURRENT RRJ ADRS SEL. BUFF | | | |
| 57 | RRB B2 | RCB NPSS-8 | | | REQ FOR TR ADRS SEL. BUFF | | | |
| 58 | RRB B3 | RCB PRFC-1 | | | -RJM ODD PARITY COMPARE | | | |
| 59 | RRB B4 | RCB PRFC-2 | | | -RSM ODD PARITY COMPARE | | | |
| 60 | RRB C1 | RCB PRFC-4 | | | RRB PARITY BIT 1 | | | |
| 61 | RRB C2 | RCB PRFC-8 | | | RRB PARITY BIT 2 | | | |
| 62 | RRB C3 | RCB RCR | | | | | | |
| 63 | RRB C4 | RCB SPARE | | | | | | |

Figure 7:
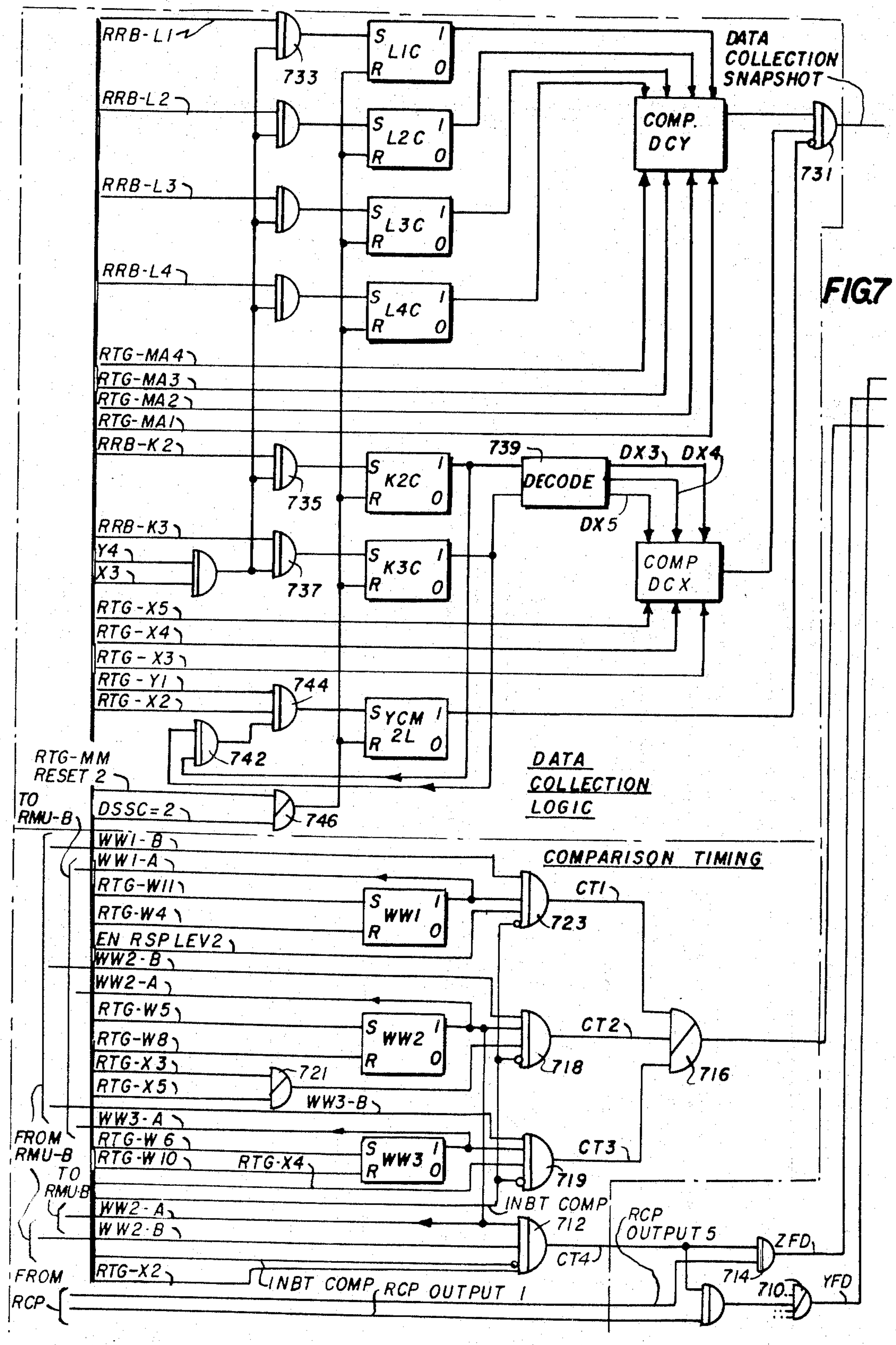
FIGS. 7 through 12 when arranged as indicated in FIG. 13 comprise a functional block diagram of the maintenance control arrangement portion of FIG. 1.

NOTES: RCP output #1 (bits 0 through 1); RCP output #2 (bits 16 through 31); Output #5 (bits 16 through 23); RCP output #3 (bits 33 through 47); RCP output #4 (bits 52 through 63).

initiating a Y recycle operation by causing the stage YRC=1 to be set and thus to reset the idle stage YRC=0, the gate 1012 being enabled by a signal YFD, which in turn is generated by an OR gate 710 of FIG. 7 in response to the signal RCP COMPARISON OUTPUT 1 from the comparator RCP indicating a mismatch in the first group of signals (bits 0 through 15) shown in the table. The gate 710 is energized by a signal CT4 from an AND gate 712 being energized by the comparison timing logic circuitry of FIG. 7. Similarly, the Z recycle counter 1112 of FIG. 11 is started in response to the output of an AND gate 1121 which in turn is energized by a signal ZFD from an AND gate 714 of FIG. 7. The gate 714 is energized in response to the RCP output signal RCP COMPARISON OUTPUT 5 indicating a mismatch in the fifth group of signals (bits 16 through 23), the other input to the gate 714 being energized by the timing signal CT4.

Referring again to the X recycle counter 1110 of FIG. 11, the X recycle operation is started only in response to a non-comparison occurring during the time that the level 5 signals are being compared. In this regard, it should be noted that the gate 1114 of FIG. 11 is energized in response to a signal EN RSP LEV 5, which is generated by a latch EN RSP LEV 5 of the RSP timing control logic of FIG. 81. The signal EN RSP LEV 5 also enables an AND gate 1227 of FIG. 12 for enabling the appropriate level 5 AND gates of the unit RSP, whereby the signals from the units RMA and RPI of the register-sender subsystem RS are gated to the comparator RCP. The latch EN RSP LEV 5 of FIG. 8 is set at X3 and is reset by an AND gate 825 at X5 W9. It should also be noted that the X recycle counter is started in response to the signal START XRC which is generated by the gate 821 of FIG. 8, and the gate 821 is enabled by a timing signal generated by an OR gate 716, of the comparison comparison timing logic of FIG. 7, which gate in turn is enabled by either one of the signals CT2 or CT3 produced by the respective AND gates 718 and 719. An OR gate 721 enables the AND gate 718 during either X3 or X5, which is a period of time when the level 5 occurs for an X recycle operation. In order to synchronize the X recycle operation with the RMU-B unit, a latch WW2 must be set to enable the gate 718 and is set between W5 and W8, the gate 718 being enabled also by a signal WW2–B from a corresponding latch WW2 (not shown) of the unit RMU–B. Similarly, a latch WW3 enables the gate 719 during W6 and W10 when the corresponding WW3 latch (not shown) of the unit RMU–B is energized during X4, which as mentioned previously, occurs during the level 5 operation.

A latch EN RSP LEV 2 of the RSP timing control logic of FIG. 8 generates a signal EN RSP LEV 2 for energizing an AND gate 1229 of FIG. 12 for energizing the level 2 AND gates of the RSP unit. The latch EN RSP LEV 2 is set by the gate 825 at X5 W9 and is reset by an AND gate 827 at X1 and when the latch W6P is set between W6 and W11. It should be noted that during the time at which the latch EN RSP LEV 2 is set, neither one of the gates 718 or 719 of the comparision timing logic of FIG. 7 is enabled to initiate an X recycle operation, since the gates 718 and 719 are enabled between X3 and X5. However, and AND gate 723 of the comparison timing logic is enabled by the signal EN RSP LEV 2 and by a latch WW1 which is set during W11 and W4 when the corresponding latch WW1 (not shown) of the RMU–B unit is set, whereby the OR gate 716 is enabled to enable in turn the AND gate 821 of FIG. 8 to cause the activation of an AND gate 830 having its other input connected to the one output of the latch EN RSP LEV 2 for initiating a snapshot operation immediately, as hereinafter described in greater detail.

As shown in FIG. 12, the remaining normal control AND gate 1232 is energized directly by the signal RTG–X2 for in turn enabling the level 6 AND gates of the unit RSP. It should be noted that the OR gate 710 of the comparison timing logic of FIG. 7 is not enabled during X2 (level 6), because the AND gate 712 which generates the signal CT4 is enabled at X2 to cause the signals YFD and ZFD to be generated for initiating Y and Z recycle operations when the signals RCP COMPARISON OUTPUT 1 and RCP COMPARISON OUTPUT 5 are generated by the comparator RCP. It should be noted also that each one of the AND gates 712, 718, 719 and 723 of FIG. 7 is inhibited by a signal INBT COMP, which is generated by an OR gate 1124 to prevent further comparisons being made after a non-comparison signal has been detected. In this regard, as hereinafter described in greater detail, when a second non-comparison occurs as a result of a recycle operation, a snapshot is taken which causes the signals of all eight levels from the unit RSP to be transfered via the cable 1225 and the memory access unit RMA to the memory MEM, and since the inputs to the comparator RCP are connected in parallel with the cable 1225, the comparator RCP continues to perform comparison operations but the mismatch signals are inhibited or rendered ineffectual by the signal INBT COMP from initiating any further recycle operations.

Considering now the error and fault logic circuits, when a non-comparison is detected in either the level 5, level 2 or the level 6 group of monitored signals, and an appropriate recycle operation is completed, the maintenance arrangement determines whether or not a non-comparison condition has been detected during or after the recycle operation. If a non-comparison condition is not present after the recycle operation, the maintenance arrangement determines that the original non-comparison was a self-correcting false signal condition caused by a momentary spurious pulse as a result of noise or the like, whereby the original non-comparison is considered to be an error and the occurrence of the error is recorded for the data processor unit DPU by writing the error count word in row 6B of the maintenance memory block Z202. In this regard, the error word is the identity of the block of memory associated with the particular data signals causing the error and consists of the Z and Y pulses designating the particular call processing memory block in which the error occurred so that the data processor unit DPU can access the maintenance memory block Z202 and determine the location of the error whereby the unit DPU can count the number of errors occurring to determine whether or not service is required.

If a non-comparison condition reappears or continues to be present during or after a recycle operation, the maintenance arrangement determines that a more permanent false signal condition has occurred and designates it as being a fault, which requires servicing by the unit DPU. In response to a fault condition, the maintenance unit causes the snapshot data information to be written into the memory block Z203 for use by the unit DPU and also writes a freeze bit in the call processing block of memory where the fault condition occurred, so that the information stored therein is prevented from being altered and thus it is preserved for use by the unit DPU for servicing purposes.

A signal CCP INHIBIT RETRIAL is generated by logic (not shown) in the RMU maintenance unit in response to the data processor unit DPU to enable the gate 843 and thus to cause the snapshot cycle of operation to be initiated without the necessity of recycle operations.

When an error condition occurs as distinguished from a fault condition, a latch WRITE ERR as shown in FIG. 9 is set to request an error count interrupt and to initiate the writing of the error word in response to an AND gate 912, which is energized during X2 W8 in response to an OR gate 914 being energized either by the signal DXRC=3 or by an AND gate 916 being energized. If the error results from an X recycle operation, the signal DXRC=3 is generated by the X recycle counter to energize the OR gate 914 directly; and if the error has resulted from either a Y recycle or a Z recycle, the signals DYRC=2 or DZRC=2 energize an OR gate 918, which in turn energizes the gate 916 at Y3. Unlike the Y and Z recycle counters, the X recycle counter is prevented from generating the error count initiating signal DXRC=3 in the event of a fault condition as hereinafter described in greater detail, whereby the latch WRITE ERR of the error count request logic is not set as a result of an X recycle fault condition. A latch XER + WER of the error count request logic is set by means of an OR gate 921, which is energized by either one of the signals RTG–X–G–ERR or RTG–W–G–ERR from the register timing generator indicating that an error condition has occurred in either the X generator pulse distributor or the W generator pulse distributor, the latch being reset by an OR gate 923 which is energized by either the setting of the latch WRITE ERR or by a signal RTG–MM RESET 3 from the register timing generator.

A latch PAUSE Y3 of the error count request logic is set by an AND gate 925 to enable the gates 918, 916, 914 and 912 whereby the latch WRITE ERR is set when the signal DXRC=2 becomes true indicating an initial non-comparison and energizes the gate 925 and when the initial non-comparison occurs during either Y1 or Y2 to enable an OR gate 927, which in turn enables the gate 925. As a result, if the initial non-comparison occurs during either Y1 or Y2, the latch WRITE ERR is set at Y3 to generate the signals WRITE ERR WORD AND ERR CT REQ, the latter signal being transferred to the unit RPI, whereby the error word is written. In this regard, as shown in FIG. 11, the X recycle counter 1110 is reset to its idle condition 0 by setting the stage XRC=0 when an OR gate 1127 is enabled by the signal PAUSE Y3 from the latch pause Y3 of the error count request logic of FIG. 9, whereby the stage XRC=3 of the X recycle counter is prevented from being set. Y1 or Y2 occur during the time at which the register junctor identity information and the translation request information are stored in memory block Z202. The latch PAUSE Y3 is reset by an OR gate 929 when the latch WRITE ERR is set during X5 via an AND gate 930 or by the signal DSSC=0.

It should be noted that once the latch WRITE ERR is set, it generates the signal ERR CT REQ which sets a latch (not shown) in the unit PPI for sending an error count request interrupt to the unit DPU for informing it of the writing of an error count word in the memory block Z202. After the latch in the RPI unit is set, it in turn generates a signal ERR INT IND to indicate that the error count interrupt has been requested of the unit DPU and in turn inhibits the gate 912 from setting the latch WRITE ERR by any other register junctor memory blocks. The inhibit is removed after the unit DPU responds to the interrupt. It should be noted also that the signal DSSC=0 enables the gate 912 so that if a snapshot operation is occurring, the error count request cannot be made until the snapshot operation has been completed. The gate 914, which enables the gate 912, also inhibits and AND gate 932 of the trouble sequence logic and thus prevents it from enabling a latch WRITE T+S, which generates the signal WRITE TROUBLE WORD as hereinafter described in greater detail.

In order to write the error count word in word 6B of row 6 of the maintenance memory block Z202, the RSP level counter and RMA address generator 1118 of FIG. 11 is preset in response to an OR gate 1129 which is energized by the signal WRITE ERR WORD, whereby the intermediate stages SLC=0 through SLC=3 of the counter and generator 1118 via the decoder 116 enables the appropriate AND gates of the enable logic of FIG. 12 to in turn enable level 6 of the unit RSP so that the timing information is transferred to the register memory access unit RMA via the cable 1225 and from the unit RMA to the memory block Z202. As shown in the table, the timing signals Y1 through Y11 and MA4 through MA11 from the register timing generator RTG are supplied to the unit RSP whereby the Y and MA information is stored in word store 6B of the memory block Z202 and comprises a single bit word indicating the Y signal time when the error count word was stored, the MA signals indicating the currently scanned memory block and thus its identity.

The memory address information for the storage location of the error count word is generated by the stages of the counter and address generator 1118, whereby the intermediate stages SLC=0 through SLC=3 having been preset by the gate 1129 also supply the necessary address information directly to the register memory access unit RMA to cause it to store the error count word in the appropriate memory location. It should be understood that the signal WRITE ERR WORD sets the stage SLC=0 indicating that the information to be stored is the error count word which is stored in the left hand memory word 6B (FIG. 6A). The address information from the counter and address generator 1118 is in binary form and along with wiring in circuit RMA thus supplies all of the necessary address information.

In order to enable the priority and interrupt unit RPI and the register memory access unit RMA, the gate 910 generates a signal RMU REQ and transfers it to the unit RPI in response to a signal WRITE TRB + ERR WORD which is generated by the gate 1129 of FIG. 11. That same signal also enables an OR gate 935 which generates a signal RMU WRITE for the unit RMA to commence the writing operation. Moreover, the latch WRITE ERR of the error count request logic of FIG. 9 enables an OR gate 937 to generate a signal RMU–RMA ADRS O for causing the unit RMA to enable only the appropriate gates (not shown) of the unit RMA for conveying the timing signals of level 6 to the memory block Z202.

Considering now the detection of a fault condition, which occurs when a non-comparison is detected following a recycle operation a latch SNAPSHOT REQ of FIG. 8 is set to request a snapshot operation. An OR gate 832 is energized in response to either the gate 821 indicating a non-comparison occurring during an X recycle operation, the signal YFD indicating a Y fault condition resulting from a non-comparison occurring during a Y recycle operation, or the signal ZFD indicating a Z fault condition which results from a non-comparison occurring during a Z recycle operation. An AND gate 834 is enabled in response to the gate 832 and in turn enables an OR gate 836. An AND gate 838 is enabled by the OR gate 836 to activate an OR gate 841, which sets the latch SNAPSHOT REQ. The AND gate 834 is enabled by an OR gate 843 to indicate that the present non-comparison condition occurred during a recycle operation. In this regard, the latch X FLT MON is set by the signal DXRC=2 from the X recycle counter and is reset by the signal DXRC=0, whereby when the X fault monitor latch X FLT MON is set, the OR gate 843 is enabled. Similarly, a latch Z FLT MON is set by the signal DZRC=2 from the Z recycle counter and is reset by the signal DZRC=0, and when set, the Z fault monitor latch enables the OR gate 843 to indicate a Z recycle operation. In order to indicate a Y recycle operation, the signal DYRC=2 enables the gate 843 directly. A pair of signals RTG–WG TRB and RTG–XG TRB enable the OR gate 836 to cause a snapshot request when a fault condition occurs within the W generator pulse distributor or the X generator pulse distributor, respectively, of the register timing generator which has its own local comparison logic circuitry (not shown).

The OR gate 836 is also energized in response to the output of an OR gate 845, which in turn is enabled by the AND gate 830. The gate 830 is energized by the signals START XRC and EN RSP LEV 2 so that if the non-comparison occurs during the level 2 time interval, a snapshot operation is requested immediately without first causing an X recycle operation, because the signals being monitored during level 2 are RCB latches and thus an X recycle will not be successful in reviewing the signals causing the initial non-comparison condition. An AND gate 847 enables the gate 845under the control of the unit DPU to request a snapshot operation, and is enabled by an OR gate 849 when the signal START XRC is not present since the latter signal activates an inhibit input to the gate 847. The gate 849 is energized by either one of the signals RPI=CCP–A SEL or RPI–CCP–B SEL from the unit RPI, which in turn generates the signals in response to signals from the data processor unit DPU. In this regard, the latter signals are present only momentarily, and thus it is desirable to initiate a snapshot operation immediately.

Considering now the snapshot operation, as shown in FIG. 10, a snapshot sequence counter 1014 controls the sequence of operations when a snapshot operation is requested. An AND gate 1012 is enabled by the setting of the latch SNAPSHOT REQ of FIG. 8 at X2, whereby the counter 1014 is advanced from its idle condition with its stage SSC=0 being reset and the stage SSC=1 being set. The counter 1014 is a four stage ring counter comprising four JK flip-flops. The counter is reset automatically to its idle condition by the signal Z201 from the register timing generator or by a signal RTG–RST (not shown) from the register timing generator in response to a manual control signal or from the data processor unit DPU. In this regard, after a snapshot is taken, and the data processor unit DPU services the register-sender subsystem RS, the snapshot sequence counter 1014 is automatically reset by the signal Z201 since the entire register-sender subsystem RS may be cleared and restarted after the servicing operation. The idle condition of SSC=0 is established by setting the first stage SSC=0 of the counter 1014 by the signal X5 from the register timing generator following a reset by the signal Z201.

At the beginning of a snapshot operation, the latch SNAPSHOT REQ of FIG. 8 is set, and it enables the gate 814 of FIG. 8 to halt the Y generator in the register timing generator RTG to preserve certain datahandling signals from the unit RMA, the unit RWT, and other units which are controlled by the Y generator distributor until such data is written in the memory RCM. Also, the gates 810 and 812 of FIG. 8 are enabled to inhibit the generation of set and reset commands from th register timing generator RTG to the units RCB, RRB, RSM and RJM so that information stored therein is preserved until it is written into the memory RCM. Moreover, as mentioned in the foregoing description, the gate 1016 of FIG. 10 is enabled to set the counter 1014 to its state SSC=1.

Considering now the snapshot sequence counter 1014, when it has advanced from its idle condition (SSC=0), the gate 1124 of FIG. 11 is enabled by the signal DSSC=1+2+3+FAULT INT IND to generate the signal INBT COMP for inhibiting the outputs of the comparator RCP by inhibiting the AND gates of the comparison timing logic of FIG. 7, and resets the X recycle counter 1110 of FIG. 11. Also, an OR gate 1074 is enabled to reset the Y recycle counter of 1010 of FIG. 10. Moreover, the signal DSSC=1+2+3+ FAULT INT IND enables an OR gate 1132 of FIG. 11 to reset the Z recycle counter 1112. The X, Y and Z counters are reset since they may have been set during prior recycling operations preceding the fault condition. Also, the signal DSSC=2 resets the latch SNAPSHOT REQ of FIG. 8 to prevent any other snapshot requests from taking place as a result of any other fault detections in order to avoid intiating more than one snapshot sequence from a single fault condition. The signal DSSC=1 and also the signal DSSC=2 enable the OR gate 910 of FIG. 9 to inhibit the generation of set and reset commands to the logic circuits (not shown) of the units RPI and RMA to preserve data stored therein until such data is written into the memory RCM.

As shown in FIG. 10 of the drawings, a latch DMC is set by means of an OR gate 1019 to generate a signal RMU DMC for disabling the matrix connection (RMU-DMC) is conveyed to the central control unit RCC via the unit RSP to prevent the sender-receiver matrix from connecting another call and thus to prevent the unit RCC from causing additional trouble conditions from occurring. When the snapshot sequence counter is advanced from its idle condition (SSC=0), the latch DMC is inhibited from being reset until the snapshot sequence counter is reset to its idle condition after a snapshot operation. In this regard, an OR gate 1021 resets the latch DMC in response to an AND gate 1023, which is inhibited by the output of an OR gate 1025. The gate 1025 is enabled when the snapshot sequence counter is advanced from its idle condition or when a fault interrupt indication signal is received from the unit RPI. An OR gate 1027 has its output connected to one of the inputs of the OR gate 1019 for setting the latch DMC, and is enabled when either the Y recycle counter 1010 of FIG. 10 of the Z recycle counter 1112 of FIG. 11 is advanced from their idle conditions to set the latch DMC. The gate 1027 also enables the gate 1023 to in turn reset the latch DMC, unless the gate 1025 inhibits the gate 1023. An AND gate 1029 also enables the gate 1019 for enabling in turn th latch DMC in response to the signals RRB–E4 and DIRECT CONTROL PULSE ENBL, which are caused to be generated by the data processor unit DPU during initial starting of the system. Similarly, the signals RESET DMC and MM RESET 3 enable the OR gate 1021 to reset the latch DMC under the control of the unit RMU.

Also in response to the snapshot sequence counter 1014 advancing from its idle position, the signal DSSC=0 becomes false to enable the OR gate 929 to reset the latch PAUSE Y3 of the error counter request logic of FIG. 9. Also, as shown in FIG. 12, an OR gate 1233 is enabled by the signal DSSC=0 becoming false to enable in turn an AND gate 1235, which generates and enable abnormal control signal for enabling each one of the eight AND gates of the B portion of each level, whereby the snapshot operation can commence. It should be noted that an AND gate 1237 is normally enabled and generates an enable normal control signal for enabling the C portion of levels 2, 5 and 6 only for the normal comparison operations. The gate 1235 is normally de-energized. Also, it should be noted that a signal RLT REQUEST from the manual test panel RLT can inhibit both of the AND gates 1235 and 1237 for test purposes. Also, the signal WRITE TRB + ERR WORD enables the OR gate 1233 to cause the enable abnormal control signal to be generated when either a trouble word or an error count word is to be written into the memory RCM.

When the snapshot sequence counter 1014 is no longer in its idle condition, the level counter and address generator 1118 of FIG. 11 is prepared to control the unit RSP for causing all of the data shown in the table to be written into the memory RCM by sequentially enabling all eight levels of the unit RSP generating the address and write commands for the register memory access unit RMA in a manner similar to the writing of the error count word. In this regard, the level counter and address generator 1118 is prepared for operation when an AND gate 1135 is enabled as a result of the reset comman DSSC=0 becoming false to cause an OR gate 1137 to remove its enabling signal from the AND gate 1139, which when enabled generates a signal for resetting each one of the stages of the counter and generator 1118. It should be noted that the signal DSSC=0 enables the gate 1135 at X4 for resetting purposes, and the signal DSSC=3 also initially starts the resetting operation by enabling the gate 1137. Moreover, the gate 1129 which is enabled when either a write trouble word or a write error word condition occurs, inhibits the AND gate 1139 from generating the reset signal so that the counter and generator 1118 can be preset to a predetermined signal condition for writing either the trouble word or the error word.

Considering now the signal condition SSC=1 of the snapshot sequence counter 1014, an AND gate 1142 of FIG. 11 is en-abled in response to the signal DSSC=1 to permit the clock pulses W11 from the register timing generator RTG to advance the level counter and address generator 1118 sequentially from its idle state SLC=P to its final or complete state SLC=C. The intermediate stages SLC=1 through SLC=3 of the level counter and address generator 1118 serve, together with the signal DSSC=1 and other fixed signals (not shown), as a memory address for the memory block Z203 of the memory RCM. Moreover, the signal DSSC=1 enables the gate 910 of FIG. 9 to generate a request signal RMU REQ for the unit RPI to write the snapshot information into the memory RCM. As a result, the level counter and address generator 1118 of FIG. 11 is sequentially advanced from the state SLC=0 to the state SLC=C. In so doing, the output signals from the SLC decoder 1116 of FIG. 11 enable sequentially the AND gates for the B portions of all eight levels, whereby all of the data signals monitored by the unit RSP are gated sequentially in groups to the register memory access unit RMA via the cable 1225 to be stored in the memory block Z203 of the memory RCM on a random access basis. The undecoded output signals of th level counter and address generator 1118 are supplied to the register memory access unit RMA to provide the necessary address information simultaneous with the transmitting of data signals for the unit RMA in response to the decoded signals from the decoder 1116.

When the counter and address generator 1118 is advanced to the stage SLC=C, the storage of the snapshot information in memory block Z203 is then completed, and the signal DSLC–C advances the snapshot sequence counter 1014 of FIG. 10 to the state SSC=2. In so doing, the signal DSSC=2 resets the latch SNAPSHOT REQ, whereby the enabling signal for the gate 814 of FIG. 8 is removed to cause the Y generator pulse distributor to commence operation again. When the snapshot sequence counter 1014 of FIG. 10 is in its SSC=3 signal condition, the signal FAULT INT REQ is generated and supplied to the unit RPI for requesting a fault interrupt. As a result, a latch (not shown) in the unit RPI is set for the purpose of requesting a fault interrupt of the data processor unit DPU so that it is alerted to the fact that the snap shot information is now stored in the memory block Z203 and that a fault condition has occurred. Thereafter, the unit RPI returns a signal RPI–FAULT INT IND to indicate that the fault interrupt has been requested and causes the gate 1025 of FIG. 10 to reset the latch DCM. Moreover, the fault interrupt indication signal inhibits an AND gate 853 so that the latch SNAPSHOT REQ is prevented from being set by subsequent fault conditions until the present fault condition has been corrected by the unit DPU.

When the snapshot sequence counter 1014 of FIG. 10 is in its condition SSC=2, a latch FREEZE OF FIG. 9A is set in response to the enabling of an OR gate 942 for the purpose of setting a freeze bit FB in the K1 position of row 1 in the memory block in which the fault condition occured, whereby the memory information in that block is inhibited from being changed so that the unit DPU can utilize the current status of the information stored therein at the time of the occurrence of the fault condition. Reference may be made to FIG. 6B of the drawings for a determination as to the location of the freeze bit FB. An AND gate 944 of FIG. 9A is enabled by the latch FREEZE to set a latch REQ MEM, which in turn generates a signal FFF and supplies it to the unit RSP for preparing it to cause the freeze bit to be written into the memory RCM. Moreover, the signal FFF enables the gate 910 of FIG. 9 to generate the request signal RMU REQ for the unit RPI. Thus, the unit RPI is prepared to write the freeze bit into the memory RCM during the next state SSC = 3 of the snapshot sequence counter 1014, which is advanced to the state SSC = 3 in response to the signal EN RSP LEV 2 serving as a convenient timing signal.

Considering now the sequence state SSC = 3 of the snapshot sequence counter 1014, the signal DSSC = 3 enables the gate 818 to reset the Y generator pulse distributor to Y1 in the register timing generator RTG for the purpose of writing the freeze bit in row 1 of the memory RCM. In order to write the freeze bit into the position K1 of row 1 of the memory, an OR gate 945 of FIG. 9 generates a signal RMU K1 which is supplied to the unit RSP to write in turn the freeze bit FB in the memory. An AND gate 947 generates a signal WRITE FREEZE BIT to enable the gate 945 in response to the signal DSSC = 3 at X4 time. It should be noted that a signal RRB–K1 also enables the OR gate 945 since the read buffer RRB of the unit RCC recirculates the memory bits through the maintenance unit RMN and can write the freeze bit directly into memory via the write transfer unit RWT of the unit RCC when a trouble condition occurs as hereinafter described in greater detail. Moreover, the signal WRITE FREEZE BIT enables the gate 937 to supply one bit of the address information (the selection of the left hand word of the memory block) and enables the gate 935 to initiate the memory writing operation. Also, the write freeze bit signal serves as the signal RMU RTG ADRS SEL for causing the appropriate memory block address to be enabled, which block in this case is the currently-scanned memory block in which the fault condition occured. An AND gate 957 of FIG. 9A is enabled during a subsequent scan cycle of operation by the signal RRB–K1 indicating that the freeze bit FB is set in the particular memory block in which the fault occurred so that the latch FREEZE remains set, whereby the logic in the unit RPI remains inhibited to prevent new information from being written into that particular memory block. The gate 957 is enabled during Y1 X3 W6. An AND gate 959 resets the latch FREEZE at the end of the time slot allotted to the memory block at Y11 X5 and the signal EN RSP LEV 2, which serves as a convenient timing signal and which enables an AND gate 962 at X5 to reset the latch REQ MEM. It should be noted that an AND gate 964 can also enable the latch FREEZE in response to a signal RTG–DRRJ–201 from the register-timing generator RTG to prevent memory alteration during Z201 from Y5 to Y 11. This prevents any change of configuration information placed in word 5 of Z201 by the RS hardware.

Under normal operations, the snapshot sequence counter 1014 of FIG. 10 is set to its idle condition by the signal X5 which sets the stage SSC = 0.

Considering now the data collection logic of FIG. 7, the snapshot request latch of FIG. 8 can also be enabled by a signal DATA COLLECTION SHAPSHOT generated by an AND gate 731 of FIG. 7 to initiate a snapshot cycle of operation in response to the data processor unit DPU directly. In this regard, the data collection logic of FIG. 7 can initiate a snapshot operation in response to data information designated DCX and DCY being stored by the unit DPU in the respective memory bits K2 and K3 and the bits L1 through L4 (see FIG. 6B) in row 4B of a call processing memory block immediately preceding the block associated with the data signals with which the snapshot operation is to be performed. The DCY information is a predetermined Y signal indicating the Y time at which the data collection snapshot operation is to be performed during the immediately following time slot of the next memory block, and the DCX information is the signal condition corresponding to either X3, X4 or X5. As a result, a data collection snapshot operation can be requested to be performed during any sub-time slot (any Y time) and either one of X3, X4 or X5 time intervals.

A comparator Comp DCY enable the AND gate 731 when a set of four latches L1C through L4C storing the DCY bits of information compare with the signals MA1 through MA4 from the register timing generator RTG. The latter bits of information are generated by a series of latches (not shown) for generating the Y timing signals Y1 through Y11. A set of four AND gates, such as the AND gate 733 set the latches L1C through L4C in response to the bits L1 through L4 stored in the preceding memory block and conveyed to the AND gates via the read buffer RRB. The comparator COMP DCY is a binary-to-decimal decoder, and its decoded value of the bits L1 through L4 comprising the DCY information is a number between 0 and 10 and is matched with a number designated by the bits MA1 through MA4 indicating a single Y sub-time slot between Y1 and Y11.

A comparator COMP DCX also enables the AND gate 731 by comparing the bits K2 and K3 which enable a pair of latches K2C and K3C via a pair of AND gates 735 and 737, respectively, and the register timing generator pulses X3, X4 and X5. A decoder 739 is a binary-to-decimal decoder and converts the outputs of the latches K2C and K3C to decoded values DX3, DX4 and DX5 which correspond directly to the signals X3, X4 and X5. If the K2 and K3 bits are both O, no data collection snapshot is requested. In this regard, an AND gate 742 in response to the latches K2C and K3C both being reset enables an AND gate 744 at Y1 and X2 to set a latch YCM 2L, which in turn inhibits the AND gate 731 from generating the data collection snapshot request signal. It should be noted that an OR gate 746 resets all of the latches of the data collection logic in response to the signal DSSC = 2 at the end of the snapshot operation or by the signal RTG-MM RESET 2 which is a signal that is generated by logic (not shown) in the register timing generator in response to signals from the data processor unit DPU. It should be understood that as in the case of an ordinary snapshot request resulting from a fault condition, the data collection snapshot also causes the fault interrupt to be generated and the memory block to be frozen by setting the freeze bit FB. The data processor unit DPU requesting a data collection waits at least ten milliseconds before reading the snapshot location in the register memory block in order to allow the register-sender time to scan the RRJ time slot used for the snapshot. Since the data collection bits DCX and DCY are stored in row 4 of the memory, they are carried from the memory block through the next register time slot in order to initiate the snapshot operation in any given row.

Considering now the system trouble logic of FIG. 9, this logic circuitry causes the generation of a system trouble interrupt and stores the system trouble word in row 6A of memory block Z202 (see FIG. 6C) to identify the call processing memory block requesting the system trouble interrupt.

When the central control unit RCC detects a system trouble, such as a time-out condition, it generates a signal RCB–TRBC via the carry buffer RCB to enable the gate 932, which in turn sets the latch WRITE T+S for generating the signal SYS TBL INT REQ and supplies it to the unit RPI for requesting a system trouble interrupt. Also, the latch WRITE T+S generates a signal WRITE TROUBLE WORD to initiate the writing of the trouble word into the memory block Z202. It should be noted that the gate 932 is enabled at Y5 X2 W6, and therefore the Y portion ERR CTY (FIG. 6C) of the information stored in row 6A is Y5 which is the current Y time of the register timing generator RTG, the Z portion ERR CTZ being the current Z time to identify the trouble interrupt producing register block. Also, the signal DSSC = 0 enables the gate 932 to prevent the system trouble interrupt from being generated during a snapshot operation. The OR gate 914 of the error count request logic of FIG. 9 inhibits the AND gate 932 so that a system trouble interrupt is not generated when an error count interrupt is in process. Moreover, once the system trouble interrupt request signal is supplied to the unit RPI, a latch (not shown) therein is set to generate the system trouble interrupt for the unit DPU and in turn generates a signal RPI- SYS TBL INT IND to inhibit the gate 932 during subsequent scanning of the memory block requesting the system trouble interrupt until the unit DPU causes the system trouble interrupt indication signal to become false and thus to remove the inhibit from the gate 932.

The data processor unit DPU sets a service bit SB in bit K1 of row 4B of the memory block requesting the system trouble interrupt for the purpose of indicating that the unit DPU is in the process of servicing the system trouble condition. As a result of setting the bit SB in position K1, an AND gate 981 is enabled in response to the bit SB being set in the memory block via the read buffer RRB generating the signal RRB–K1, whereby the gate 981 sets a service bit control latch SBC to inhibit the AND gate 932. It should be noted that the gate 981 is set at Y4 X4 and the latch SBC is reset at Y1, which is the beginning of the following time slot.

The freeze bit FB is generated in response to a system trouble interrupt for the purporse of freezing the memory block requesting such an interrupt so that the data processor unit DPU is provided with the current status of the information stored in the frozen memory block for its own information purposes. An OR gate 983 is enabled by an AND gate 985, which in turn is enabled by the signal RCB–TRBC at Y9, whereby the gate 983 generates a signal RMU RWT FRZ and supplies it to the write transfer unit RWT for the purpose of causing the signal RRB–K1 from the unit RRC to enable the gate 945 of FIG. 9 for th purpose of writing the freeze bit into the memory RCM in the same manner as described in connection with the snapshot operation. It should be noted that the latch SBC, when set, inhibits the gate 985 from writing the freeze bit. Also, a signal RTG TEST FRZ generated by the timing generator unit RTG in response to the data processor unit DPU, whereby the unit DPU can also write the freeze bit into a given memory block for servicing purposes so that a given block of memory can be frozen directly by the unit DPU for servicing purposes.

After servicing a system trouble interrupt, the unit DPU can permit the particular memory block having requested the system trouble interrupt to continue a call processing operation even though a trouble condition has occurred. In this regard, the data processor unit DPU can reset the freeze bit directly and thus can permit the latch SBC to remain set to inhibit the writing of the freeze bit and the requesting of additional system trouble interrupts. Thus, a call can be cleared and it may be re-instituted by the subscriber after a busy condition has been returned.

OPERATION

Considering now some typical operations of the maintenance arrangement, a flase signal condition is assumed to have occurred, and as a result, the signal RCP OUTPUT 2 is generated by the comparator RCP of FIG. 12, indicating that a non-comparison condition has occurred among the signals monitored within that group of bits as shown in the table A. As a result, as shown in FIG. 8, the gates 823 and 821 generate a signal START XRC to initiate an X recycle operation. As shown in FIG. 11, the start X recycle signal enables the gate 1114 to advance the X recycle counter 1110 from its idle state (XRC = 0) to the state XRC = 1. It should be noted that the recycle counter is started at a time determined by the signal EN RSP LEV 5, which is the time when the signal RCP OUTPUT 2 is generated. Thereafter, as shown in FIG. 8, gates 810 and 814 are enabled by the signal DXRC = 0 becoming false to prevent certain signal conditions from being changed and to cause the Y generator pulse distributor in the register timing generator RTG to halt so that the X generator pulse distributor can recycle in the same Y time. Also, as shown in FIG. 9, the gate 910 is enabled by the signal DXRC = 1 to supply the signal RMU REQ to the unit RPI. In response to the signal EN RSP LEV 2, the X recycle counter of FIG. 11 is advanced to the state XRC = 2, and thereafter if a second non-comparison does not occur during the recycle operation, the X recycle counter is advanced to the state XRC = 3. The gate 914 of the error count request logic of FIG. 9 is enabled by the signal DXRC = 3 to cause the gate 912 to set the latch WRITE ERR, whereby the error count word is written into the memory block Z202 in accordance with the foregoing description. The signal ERR INT IND from the unit RPI inhibits the gate 912 once the error count interrupt is generated from the unit RPI to request the services of the unit DPU. Moreover, the error count interrupt indication signal cause the X recycle counter to be reset by enabling the gate 1124 of FIG. 11. Also, the Y recycle counter 1010 is reset at Y2 by means of an AND gate 1072. Also, as mentioned in the foregoing description, the gates 910 and 935 of FIG. 9 are enabled by the signal WRITE TRB + ERR WORD in response to the gate 1129 of FIG. 11 for causing the error count word to be written into the memory. The gate 1233 of FIG. 12 is enabled and in turn enables the gate 1235 to generate the enable abnormal control signal for causing the error count word data to be selected and thus to be transferred via the unit RSP and RCP to the memory access unit RMA for storage in the memory. Thereafter, the cycle counter is advanced to its idle condition (SSC = 0) by the signal EN RSP LEV 2, which serves as a clock pulse for the stage XRC = 0, and the setting or enabling signal is generated by the gate 1127 which is set by the stage XRC = 3.

If a fault condition occurs causing a second non-comparison condition during the X recycle operation, the error count word is not written into the memory, but the snapshot operation is initiated. In this regard, after an X recycle operation, as shown in FIG. 8, the latch SNAPSHOT REQ is set by the gates 832, 834, 836, 838, and 841 when the signal START XRC is generated and the latch X FLT MON is set in response to the signal DXRC = 2. The setting of the snapshot request latch initiates a snapshot operation in accordance with the foregoing description. The snapshot request latch causes the snapshot sequence counter 1014 of FIG. 10 to be activated by enabling the gate 1016 at X2 to advance the counter to the state SSC = 1. Moreover, the snapshot request latch also enables the gate 1019 to set the latch DMC to prevent further processing of certain sender/receiver functions until after snapshot operations are complete. Also, the gate 1124 of FIG. 11 is enabled by the signal DSSC = 1 + 2 + 3 + FAULT INT IND to generate the signal INBT COMP for causing the comparison timing logic of FIG. 7 to be inhibited, whereby further non-comparisons are ignored. As shown in FIG. 11, a gate 1158 is enabled by the signal DSSC = 0 + FAULT INT IND to in turn enable the gate 1124 for resetting the X recycle counter 1110 to its idle condition XRC = 0. In accordance with the foregoing description, the snapshot sequence counter 1014 drives the level counter and address generator 1118 to supply the address and data information to the memory RCM for the purpose of storing the snapshot information in the snapshot memory block Z203. When the snapshot sequence counter is advanced to its state SSC = 2, the gate 942 of FIG. 9A sets the latch FREEZE, and in turn the gate 944 sets the latch REQ MEM for preparing the storage of the freeze bit FB. Thereafter, when the snapshot sequence counter is advanced to its stage SSC = 3, the gate 947 of FIG. 9 causes the freeze bit to be written into the memory and enables the gates 1137 and 1139 of FIG. 11 to reset the counter 1118. When the level counter and address generator 1118 is advanced to its state SLC = C, the snapshot counter SSC is advanced to its state SSC = 2 for the purpose of sending the fault interrupt request to the unit RPI, which in turn generates the fault interrupt for the unit DPU. As shown in FIG. 11, the gate 1158 is enabled by the fault interrupt indication signal received from the unit RPI to cause the X recycle counter to be reset to its idle condition. It should be noted that the signal Z201 from the register timing generator in any event resets the X recycle counter to its idle state at the end of each cycle time. Moreover, the fault interrupt indication signal causes the latch DMC to be reset as shown in FIG. 10. At Z201 which is the end of the system cycle, the register timing generator resets the snapshot counter 1014, and the unit DPU eventually clears the freeze bit FB from the memory.

Considering now the Y and Z recycle operations, the Y recycle operation is initiated when the gate 710 of FIG. 7 generates the signal YFD in response to a non-comparison occurring at the first output of the comparator RCP. As a result, the gate 1012 of FIG. 10 advances the Y recycle counter from its idle state (YRC = 0) to the state YRC = 1. The signal YRC = 1 enables the gate 818 of FIG. 8 to cause the Y generator pulse distributor of the register timing generator RTG to be reset to Y1 and to inhibit the Z generator pulse distributor. Thereafter, at Y1, the signal X1 W6 advances the Y recycle counter to the state YRC = 2. Thereafter, assuming that an error has occured, the gate 918 of the error count logic of FIG. 9 is enabled by the signal DYRC = 2 to cause the gate 916 to be enabled at Y3, whereby the latch WRITE ERR is set and thus causes the error count word to be written into the memory block Z202. It should be noted that if a fault occurs during Y1 or Y2 when a Y recycle is occuring, the error count word is not written into the memory, but a snapshot operation is initiated. Also, a snapshot operation is initiated regardless of whether or not an error count interrupt has been initiated and the error count word has been stored in the memory. Thus, if a second non-comparison condition occurs during any Y time when a Y recycle operation is occurring, the gate 843 of FIG. 8 is enabled by the signal DYRC = 2 for the purpose of setting the snapshot request latch to initiate a snapshot operation. It should be noted that the Y recycle counter 1010 of FIG. 10 is reset to its initial condition Y1 in response to an OR gate 1074 by the fault interrupt indication, or by the snapshot sequence counter 1014 being advanced from its idle condition, but in any event the Y recycle counter is reset by the signal Z201 from the register timing generator at the end of a system cycle when a fault has not occurred.

Considering now a Z recycle operation, the gate 1121 of FIG. 11 is enabled to cause the Z recycle counter to be advanced to its state ZRC = 1. Thereafter, the Z generator pulse distributor is set to Z0 and the Y generator pulse distributor is reset to Y1. Thereafter, at Z0 Y1 X1 W6, the Z recycle counter is advanced to its state ZRC = 2 so that at Z0 Y3 the gate 916 of the error count request logic is enabled to cause the latch WRITE ERR to be set and thus to cause the error count word to be stored in the memory block Z202. If a second non-comparison condition does not occur, the gate 1162 of FIG. 11 is enabled at Z201 Y11 for resetting the stage ZRC = 3, and a gate 1164 of FIG. 11 resets the Z recycle counter to its idle condition (ZRC = 0) in response to the signal Z201 and –ZRC = 0.

As mentioned in the foregoing description a snapshot operation can also be initiated at any time directly by the data processor unit DPU. In this regard, a data collection snapshot operation is initiated by the unit DPU writing the DCY and DCX data information in the call processing memory block immediately preceding the block associated with the data signals to be stored in the snapshot memory block Z203. In response to the DCY and DCX information stored in the memory as hereinbefore described, the gate 731 of FIG. 7 is enabled to cause the latch SNAPSHOT REQ to be set and thus to cause a snapshot operation including the setting of the freeze bit FB.

A system trouble interrupt and the writing of the trouble word in the memory block Z202 occurs any time a system trouble condition arises in the register-sender subsystem RS. In response to such a condition, as described in the foregoing discussion of the system trouble logic, the signal TRBL from the read buffer RRB causes the latch WRITE T + S FIG. 9 to be set and to cause the generation of both the system trouble interrupt request signal and the write trouble word signal, and thus such an operation can occur at the time of a system trouble condition.

What is claimed is:

1. A maintenance arrangement for a data handling system comprising a plurality of groups each producing data handling signals and having memory means with servicing equipment to diagnose system trouble conditions identification means for identifying said groups, trouble means responsive to a trouble condition in one of said groups to generate a system trouble condition signal, with the identification means supplying system trouble identity information for that group; said maintenance arrangement comprising:

a particular maintenance storage area in said memory means for trouble identity information;

system trouble logic means responsive to said system trouble condition signal for generating a servicing request signal for the servicing equipment; and memory control means responsive to said servicing request signal for causing said system trouble identity information indicative of the identity of a certain group of data handling signals associated with said system trouble condition to be conveyed to said memory means for storage therein and for generating address information for directing said system trouble identity information to said particular maintenance storage area therein so that the servicing equipment can readily identify said certain group of data handling signals.

2. A maintenance arrangement according to claim 1, wherein said memory control means includes data selecting means for supplying said system trouble identity information to said memory means, counter means for generating select signals to enable selectively said data selecting means to supply sets of said identity information of said memory means, means for conveying said select signals from said counter means to said memory means to serve as said address information.

3. A maintenance arrangement according to claim 2, wherein said data selecting means includes N number of selecting sets of coincidence logic gates responsive to said data handling signals, said control means generating N number of select signals individually associated with each one of said sets of selecting gates for enabling selectively on one-at-a-time basis said sets of gates.

4. A maintenance arrangement according to claim 3, wherein said counter means includes a sequence level counter sequentially advanced by a system clock source, said source also supplying timing signals for data handling system 5. A maintenance arrangement according to claim 2, wherein said memory means includes a plurality of processing storage elements and a plurality of maintenance storage elements, a block of said maintenance storage elements for storing said identity information.

6. A maintenance arrangement according to claim 5, wherein said data handling system includes a plurality of register junctors and register apparatus comprising said memory means, register logic circuits shared on a time division multiplex basis, and a plurality of registers individually associated with said junctors, each register comprising a block of said processing storage elements, said system trouble identity information comprising information identifying one of said registers.

7. A maintenance arrangement according to claim 6, wherein said data handling signals include said timing signals, said timing signals including register time slot signals, said system trouble identity information comprising one of said register time slot signals.

8. A maintenance arrangement according to claim 7, further including means responsive to a service bit set in said memory means for preventing said system trouble logic means from generating said service request signal.

9. A maintenance arrangement according to claim 8, wherein said system trouble logic means comprises a write trouble-service latch circuit.

10. A maintenance arrangement according to claim 1, further including means responsive to a service bit set in said memory means for preventing said system trouble logic means from generating said service request signal.

11. A maintenance arrangement according to claim 10, wherein said memory means includes a plurality of processing storage elements and a plurality of maintenance storage elements, a block of said maintenance storage elements for storing said identity information.

12. A maintenance arrangement according to claim 11, wherein said data handling system includes a plurality of register junctors and register apparatus comprising said memory means, register logic circuits shared on a time division multiplex basis, and a plurality of registers individually associated with said junctors, each register comprising a block of said processing storage elements, said system trouble identity information comprising information indentifying one of said registers.

13. A maintenance arrangement for a data handling system producing data handling signals and having memory means, with servicing equipment to diagnose system trouble conditions;

wherein said data handling system includes a plurality of register junctors and register apparatus comprising said memory means, register logic circuits shared on a time division multiplex basis, and a plurality of registers individually associated with said junctors, and the memory means comprises a plurality of blocks of storage elements, some of said blocks being processing blocks and other of said blocks being maintenance blocks, each register comprising an individual one of said processing blocks, timing generator means supplying time slot signals in cyclically recurring time slots, with each register assigned an individual time slot with the time slot signals used to address the corresponding processing blocks, trouble responsive means effective during signal processing to record a trouble condition in the processing block for the register being processed and to produce a system trouble condition signal;

said maintenance storage area in one of said maintenance blocks for storing the identity of a register having a trouble condition, said particular maintenance storage area having a given address;

system trouble logic means which is enabled responsive to said system trouble condition signal to thereby generate a servicing request signal for the servicing equipment;

memory control means including a maintenance address generator, maintenance data selecting means, and means coupling them to the memory means;

and means responsive to the system trouble logic means being enabled to set the maintenance address generator to said given address and to enable the maintenance data selecting means to supply time slot signals from said timing generator means which identify the register having the system trouble condition, so that the identity of that register is stored as data in said particular maintenance storage area for use by the servicing equipment.

14. A maintenance arrangement according to claim 13, wherein one storage element of each of the processing blocks of the memory means is for a service bit which is set by the servicing equipment in response to said servicing request signal in the block for the register whose identity is stored in the particular maintenance storage area;

and means responsive to the service bit set to prevent enabling of the system trouble logic means.

15. A maintenance arrangement according to claim 14, wherein each of said processing blocks of the memory means comprises a number of word stores each having a number of said storage elements, and said timing generator means supplies a plurality of sub-time signals during each time slot to select the word stores one at a time;

and wherein sub-time slot signals are supplied along with the time slot signals via said maintenance data selecting means and stored in said particular maintenance storage area to further identify the source of the trouble condition.

* * * * *